(12) United States Patent
Chipouras et al.

(10) Patent No.: US 10,484,817 B1
(45) Date of Patent: Nov. 19, 2019

(54) METHODS AND SYSTEMS FOR SURFACING A USER-CUSTOMIZED SEGMENT WITHIN A GEOSPATIAL NAVIGATION APPLICATION

(71) Applicant: Verizon Patent and Licensing Inc., Arlington, VA (US)

(72) Inventors: John Chipouras, Denver, CO (US); Daniel Austin Kopyc, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/121,493

(22) Filed: Sep. 4, 2018

(51) Int. Cl.
| | |
|---|---|
| *H04W 4/021* | (2018.01) |
| *H04W 4/029* | (2018.01) |
| *H04W 4/024* | (2018.01) |
| *G06F 16/29* | (2019.01) |
| *G06F 16/23* | (2019.01) |
| *G06F 16/9535* | (2019.01) |
| *G06F 16/9537* | (2019.01) |
| *G06F 16/2457* | (2019.01) |

(52) U.S. Cl.
CPC ........ *H04W 4/021* (2013.01); *G06F 16/2379* (2019.01); *G06F 16/24578* (2019.01); *G06F 16/29* (2019.01); *G06F 16/9535* (2019.01); *G06F 16/9537* (2019.01); *H04W 4/024* (2018.02); *H04W 4/029* (2018.02)

(58) Field of Classification Search
CPC ..... H04W 4/021; H04W 4/024; H04W 4/029; G06F 16/2379; G06F 16/9535; G06F 16/9537; G06F 16/24578; G06F 16/29

USPC ...................................................... 455/456.1
See application file for complete search history.

(56) References Cited

U.S. PATENT DOCUMENTS

| | | | | |
|---|---|---|---|---|
| 2008/0253757 | A1* | 10/2008 | Bells ...................... | G03B 17/00 396/77 |
| 2011/0105143 | A1* | 5/2011 | Harple .................... | G06F 16/29 455/456.1 |
| 2012/0041672 | A1* | 2/2012 | Curtis .................... | H04W 4/029 701/426 |
| 2012/0143501 | A1* | 6/2012 | Tang .................... | G01C 21/3476 701/465 |
| 2012/0254804 | A1* | 10/2012 | Sheha .................... | G06Q 30/02 715/834 |
| 2013/0337830 | A1* | 12/2013 | Haro ...................... | G06Q 50/01 455/456.1 |

(Continued)

*Primary Examiner* — Mong-Thuy T Tran

(57) ABSTRACT

An exemplary geospatial navigation system accesses, from a mobile device used by a user, a user action report representative of a first action taken by the user with respect to a first point of interest and identifies a second point of interest for which the user has not taken an action. The system updates a user-customized segment to include the first and second points of interest and to increase their prominence scores. The system directs the mobile device to present a user interface of a geospatial navigation application in a manner that surfaces the updated user-customized segment by emphasizing representations of points of interest in accordance with respective prominence scores. Accordingly, the first and second points of interest are emphasized over additional points of interest that are not included within the user-customized segment and/or that have prominence scores lower than those of the first and second points of interest.

20 Claims, 11 Drawing Sheets

(56) References Cited

U.S. PATENT DOCUMENTS

| | | | |
|---|---|---|---|
| 2014/0022096 A1* | 1/2014 | Agarwal | G01C 21/3617 |
| | | | 340/995.27 |
| 2014/0233863 A1* | 8/2014 | Barrington | G06F 16/5866 |
| | | | 382/305 |
| 2014/0244165 A1* | 8/2014 | Bells | G01C 21/367 |
| | | | 701/455 |
| 2015/0160017 A1* | 6/2015 | Yang | G01C 21/3679 |
| | | | 701/400 |
| 2015/0312722 A1* | 10/2015 | Mori | H04W 4/029 |
| | | | 455/456.3 |
| 2016/0061617 A1* | 3/2016 | Duggan | G06F 16/248 |
| | | | 701/538 |
| 2017/0329780 A1* | 11/2017 | Salowitz | G01C 21/3679 |
| 2018/0025028 A1* | 1/2018 | Fransen | G06F 16/9537 |
| | | | 707/803 |
| 2018/0350144 A1* | 12/2018 | Rathod | H04W 4/029 |
| 2019/0045331 A1* | 2/2019 | Liang | H04W 4/185 |

\* cited by examiner

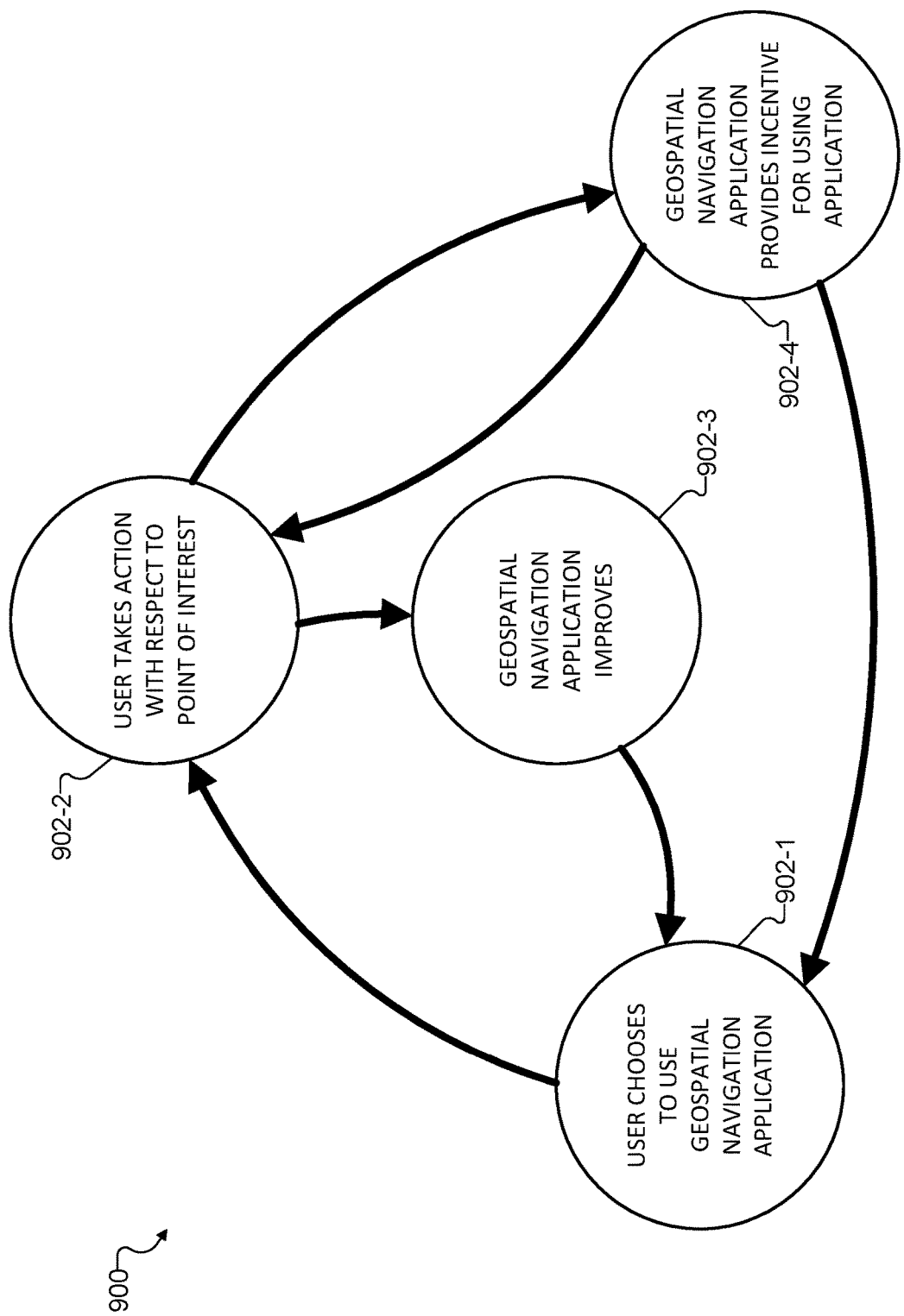

METHODS AND SYSTEMS FOR SURFACING A USER-CUSTOMIZED SEGMENT WITHIN A GEOSPATIAL NAVIGATION APPLICATION

BACKGROUND INFORMATION

Use of mobile devices has proliferated in recent years. Because many of these mobile devices include hardware and software for determining and reporting real-time geolocations of the mobile devices, various applications using such geolocation data have been developed and have gained popularity. For example, geospatial navigation software and other mobile applications help users navigate the world, find and access services and/or people based on their real-time geolocations, and contribute real-time location data to crowd-sourced databases used by others (e.g., real-time traffic data, etc.).

Geospatial navigation applications may present users with maps, lists, and other information that includes representations of one or more points of interest (i.e., locations such as stores, restaurants, public locations of interest, etc.). For instance, in some examples, geospatial navigation applications may be configured to display icons representative of points of interest on a map, to specify points of interest in a list format (e.g., a list of search results, etc.), or the like. In presenting points of interest in these or other similar ways, it may be desirable for geospatial navigation applications to customize the presentation (e.g., the maps, the lists, etc.) to individual users so as to make the application more convenient, efficient, and/or effective for the users to use. While some conventional geospatial navigation applications apply certain basic customizations (e.g., using a search history to make finding previously-searched points of interest easier to search for and locate again in the future or the like), these conventional customizations are limited. As such, there remains room for improvement to better customize geospatial navigation applications for specific users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9 illustrates an exemplary flow diagram according to principles described herein.

DETAILED DESCRIPTION OF PREFERRED EMBODIMENTS

Figure 1:
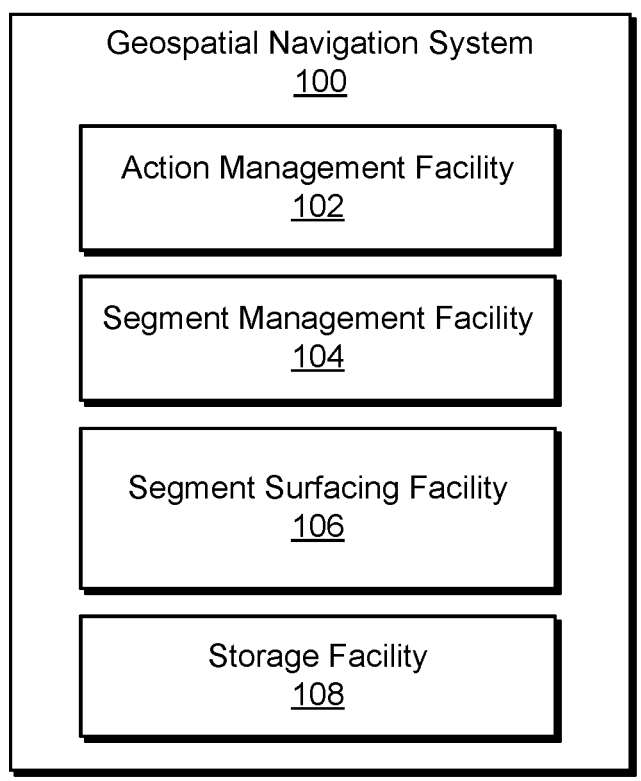
FIG. 1 illustrates an exemplary geospatial navigation system for surfacing a user-customized segment within a geospatial navigation application according to principles described herein.

Methods and systems for surfacing a user-customized segment within a geospatial navigation application are described herein. For example, as will be described in more detail below, an exemplary geospatial navigation system may be implemented by a geospatial navigation server operated by a provider of a geospatial navigation service, by a mobile device being used by a user to use such a geospatial navigation service, by another suitable computing device, or by any combination thereof as may serve a particular implementation. Regardless of which computing device or devices implement the geospatial navigation system, the geospatial navigation system may be configured to surface the user-customized segment within the geospatial navigation application by performing operations described herein.

For example, the geospatial navigation system may access a user action report from a mobile device used by a user (e.g., a mobile device implementing the geospatial navigation system, a mobile device communicatively coupled to the geospatial navigation system, etc.). The user action report may be representative of a first action taken by the user with respect to a first point of interest included in a plurality of points of interest for which data is stored in a point of interest database accessible to the geospatial navigation system. For instance, in one particular example, the point of interest may be a particular restaurant, and the first action taken by the user with respect to the first point of interest may be searching for the particular restaurant using a geospatial navigation application, routing to the particular restaurant using the geospatial navigation application, visiting the particular restaurant, dwelling at a location near the restaurant, habitually driving past the restaurant or navigating in the neighborhood of the restaurant, or the like.

Based on the user action report (and the first action represented therein), the geospatial navigation system may identify a second point of interest included in the plurality of points of interest for which data is stored in the point of interest database. While the user took the first action with respect to the first point of interest, the second point of interest may be a point of interest with respect to which the user has not been reported to have taken a second action. For instance, referring back to the particular restaurant example above, the second point of interest may be a second restaurant that the user has not ever visited, routed to, searched for, or, perhaps, even heard of.

Based on the user action report and the identification of the second point of interest, the geospatial navigation system may update a user-customized segment that is customized with respect to the user. The user-customized segment may be associated with the user based on a user profile that the user has created with a geospatial navigation service and is signed into, based on an assumption that the user is the only person to use the mobile device (thus not requiring sign-in or setup of a user profile), or in any other manner as may serve a particular implementation. In updating the user-customized segment based on the user action report and the identification of the second point of interest, the geospatial navigation system may include the first and second points of interest in the user-customized segment (e.g., by verifying that the points of interest are included in the user-customized segment and adding them to the user-customized segment if they are not yet included). Additionally, the geospatial navigation system may increase, within the user-customized segment, a first prominence score corresponding to the first point of interest and a second prominence score corresponding to the second point of interest.

Using the updated user-customized segment, the geospatial navigation system may direct the mobile device to present a user interface of a geospatial navigation application in a manner that surfaces the updated user-customized segment to emphasize points of interest that are determined to be relevant to the user while deemphasizing other points of interest. For example, as will be described in more detail below, surfacing the user-customized segment may be performed by emphasizing, in various different ways, representations of points of interest in accordance with respective prominence scores of the points of interest. As such, for instance, representations of the first and second points of interest described above may be emphasized over representations of additional points of interest that are not included within the user-customized segment or that have prominence scores lower than the first and second prominence scores.

Methods and systems described herein for surfacing a user-customized segment within a geospatial navigation application may provide various advantages and benefits over conventional geospatial navigation application technology. For example, methods and systems described herein provide improved techniques for detecting, accessing, organizing, analyzing, and making effective use of data indicative of user behavior and preferences so as to provide solutions to technical challenges involving automatic detection of user navigational preferences, automatic customization of geospatial navigation applications to leverage such detected preferences, and so forth. In this way, while conventional geospatial navigation applications fail to provide anything more than relatively rudimentary customization (e.g., based only on a search history of a user), methods and systems described herein generate, develop, and build up nuanced and comprehensive user-customized segments that account for various types of user actions and trends derived from such user actions.

Geospatial navigation methods and systems described herein not only provide customized views (e.g., customized user interface views such as customized map views) of points of interest particular users are interested in based on past behavior, but further provide customized recommendations and predictions about points of interest in which the users are likely to be interested but of which the users may not yet be aware. Moreover, because the user-customized segment is updated and surfaced in natural and intuitive ways described herein, customizations in accordance with the methods and systems described herein may be largely transparent to the users. From a user's perspective, the geospatial navigation application may simply seem to be on the "same wavelength" with the user, consistently emphasizing points of interest that are relevant, deemphasizing points of interest that are irrelevant, and improving over time as the user uses the geospatial navigation application.

Due to the advanced and low-impact customizations provided by methods and systems described herein, users and providers of geospatial navigation services associated with the advanced geospatial navigation systems described herein may both benefit. For example, users may benefit by having access to a geospatial navigation application that is more comprehensively customized to the users' interests and preferences, and that, therefore, is easier and more enjoyable to use. As users come to prefer and increase their usage of the geospatial navigation application, a positive feedback loop may develop in which the users use the geospatial navigation application more often and thereby provide more information to the geospatial navigation service, which information can be used to improve the geospatial navigation service and application to encourage the users to use it even more. This feedback loop will be described in more detail below. Providers of the geospatial navigation service may also benefit from the positive feedback loop enabled by the methods and systems described herein. For example, by receiving user feedback by way of the feedback loop, the providers may build a superior geospatial navigation application product that provides advanced customizations of the geospatial navigation application, such as by surfacing a user-customized segment within the geospatial navigation application as described herein.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary geospatial navigation system 100 ("system 100") for surfacing a user-customized segment within a geospatial navigation application. As shown, system 100 may include, without limitation, an action management facility 102, a segment management facility 104, a segment surfacing facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. As will be described in more detail below, facilities 102 through 108 may, in some examples, be distributed between multiple devices and/or multiple locations as may serve a particular implementation. Additionally, one or more of facilities 102 through 108 may be omitted from system 100 in certain implementations, while additional facilities may be included within system 100 in the same or other implementations.

In certain implementations, facilities 102 through 108 may be configured to operate in real time so as to update and surface user-customized segments within a geospatial navigation application as user actions are performed and detected. In this way, a geospatial navigation service may immediately and seamlessly improve (e.g., by becoming more accurately and/or comprehensively customized to a user's preferences) whenever the user is using the geospatial navigation service. As used herein, operations may be performed in "real time" when they are performed immediately and without undue delay. For example, real-time operations of accessing, identifying, updating, and directing operations associated with surfacing a user-customized segment within a geospatial navigation application may be completed while a geospatial navigation application is being presented to and used by a user, even if there is some amount of delay such as a few seconds.

Each of facilities 102 through 108 may include or be implemented by one or more physical computing devices implemented by computer hardware (e.g., processors, memories, storage facilities, communication interfaces, etc.) that executes computer software (e.g., instructions stored in memory for execution by the processors, etc.). In some examples, the facilities may be implemented using separate computing components unique to each facility, while, in other example, the facilities may be implemented using shared computing components. Each of facilities 102 through 108 will now be described in more detail.

Action management facility 102 may be configured to perform various operations associated with accessing (e.g., receiving, generating, etc.), organizing, storing, and/or otherwise managing user action reports representative of actions taken by a user of system 100 with respect to different points of interest. For example, action management facility 102 may be configured to access, from a mobile device used by the user (e.g., a mobile device implementing system 100 or to which system 100 is communicatively coupled), user action reports representative of actions taken by the user with respect to different points of interest. In particular, action management facility 102 may access from the mobile device a user action report representative of a first action taken by the user with respect to a first point of interest included in a plurality of points of interest for which data is stored in a point of interest database accessible to the geospatial navigation system (e.g., included within storage facility 108 as will be described in more detail below).

Segment management facility 104 may be configured to perform various operations associated with generating, updating, maintaining, and/or otherwise managing different types of segments described herein. For instance, segment management facility 104 may manage one or more user-customized segments, one or more interest segments, and/or any other types of segments as may serve a particular implementation. As will be described and illustrated in more detail below, a "segment" may refer to a collection of points of interest sharing one or more common attributes such as that the points of interest have been determined to be relevant to a particular user (a "user-customized segment"), have been determined to relate to a particular interest category (an "interest segment"), or the like. Different types of segments may associate different data with the points of interest included in the segments. For instance, certain segments may associate each point of interest included in the segment with a prominence score, a relevance score, information about the point of interest, information about one or more users' relationships with the point of interest, and/or any other data as may serve a particular implementation. Exemplary user-customized segments and interest segments will be illustrated and described in more detail below.

In some examples, segment management facility 104 may be configured to manage a user-customized segment that is customized to a user of system 100 by identifying a second point of interest based on the user action report described above (which is representative of the first action). The second point of interest identified by segment management facility 104 may be included in the plurality of points of interest for which data is stored in the point of interest database. In some examples, segment management facility 104 may identify, for the second point of interest, a point of interest with respect to which the user has not been reported to have taken a second action. For instance, in some examples, the second point of interest may be a point of interest related to the first point of interest according to one or more interest segments managed by segment management facility 104, but may be a point of interest with which the user is not familiar.

In some examples, the second action that the user has not been reported ever to have taken with respect to the second point of interest may be a particular action, rather than, as may be the case in other examples, any suitable action. For instance, in some examples, the user may not have ever taken any action with respect to the second point of interest, and segment management facility 104 may identify the second point of interest based only on shared attributes of the first and second points of interest, the fact that both points of interest are included in one or more interest segments together, or the like. In other examples, however, the user may have taken some type of action with respect to the second point of interest while not having taken some other particular action. For example, the user may often pass by the second point of interest or visit another point of interest in the same neighborhood as the second point of interest, either of which may be considered to be an action taken by the user with respect to the second point of interest in some implementations. However, the user may not ever have been reported to perform other particular actions with respect to the second point of interest, such as searching for the point of interest, routing to the point of interest, dwelling at (i.e., visiting) the point of interest, or the like. As such, segment management facility 104 may identify the second point of interest as a point of interest with respect to which the user has not been reported to have taken the second action, which may be one of the particular actions of searching for, routing to, or dwelling at the second point of interest.

Based on the user action report representing the first action taken with respect to the first point of interest and the identified second point of interest for which the second action has not been taken, segment management facility 104 may update a user-customized segment customized with respect to the user. For example, segment management facility 104 may update the user-customized segment to include both the first and second points of interest (i.e., adding the points of interest to the user-customized segment if they are not already included), and to increase respective prominence scores for both points of interest within the user-customized segment (i.e., increasing a first prominence score corresponding to the first point of interest and increasing a second prominence score corresponding to the second point of interest). In this way, the user-customized segment may become even more accurately and comprehensively customized to the user's preferences and interests than before the update, thereby improving the geospatial navigation service and the user's experience with the service as described above.

Segment surfacing facility 106 may be configured to cause a geospatial navigation application being used by the user to surface the user-customized segment customized to the user in any manner as may serve a particular implementation. For example, segment surfacing facility 106 may direct the mobile device to present a user interface of the geospatial navigation application in a manner that surfaces the updated user-customized segment. If the mobile device implements system 100, segment surfacing facility 106 may perform this direction of the mobile device by directly presenting the user interface in the manner described. Conversely, if system 100 is implemented separately from the mobile device (e.g., on a geospatial navigation server communicatively coupled to the mobile device), segment surfacing facility 106 may perform this direction of the mobile device by sending instructions to this effect to the mobile device, by providing application software to be executed by the mobile device, or in any other suitable manner.

A user-customized segment may be considered to be surfaced within a user interface when the user-customized segment is used to guide, direct, or alter the presentation of the user interface in any suitable manner as may be used to emphasize points of interest within the user-customized segment over other points of interest. For example, when a user-customized segment is surfaced within a user interface including a map, the map may present points of interest included within the user-customized segment in different ways than points of interest not included within the user-customized segment are presented. As will be described in more detail below, for instance, points of interest included in the user-customized segment may be presented with increased prominence (e.g., highlighted), presented when they otherwise might not be presented (e.g., when the level of zoom is zoomed out too much to normally show such points of interest, when the bounding box of a user interface view is positioned such that the points of interest are out of frame, etc.), or otherwise prioritized and given special treatment in the user interface as compared to other points of interest not included in the user-customized segment.

Accordingly, the surfacing of the user-customized segment by the geospatial navigation application (as directed by system 100) may be performed in any suitable way. For instance, the geospatial navigation application may be directed to emphasize, within the user interface, representations of points of interest in accordance with respective prominence scores of the points of interest. As such, the representations of the first and second points of interest may be emphasized, for example, over representations of additional points of interest that are also included in the plurality of points of interest for which data is stored in the point of interest database, but that are either not included within the user-customized segment or have prominence scores lower than the first and second prominence scores. Various ways of emphasizing representations of certain points of interest over other points of interest within a user interface will be described and illustrated in more detail below.

Storage facility 108 may store any data as may be used by system 100 to perform any of the operations described herein, including those operations described above as being performed by facilities 102 through 106. For example, storage facility 108 may include general management data for operation of system 100 (e.g., user input data, user settings, program instructions for performing operations described herein, etc.), data representative of points of interest (e.g., included in a point of interest database included within storage facility 108), data representative of segments (e.g., user-customized segments, interest segments, etc.), and/or any other data received, generated, managed, maintained, used, and/or transmitted by facilities 102 through 106 as may serve a particular implementation. Storage facility 108 and specific data included therein will be described in more detail below.

Figure 2:
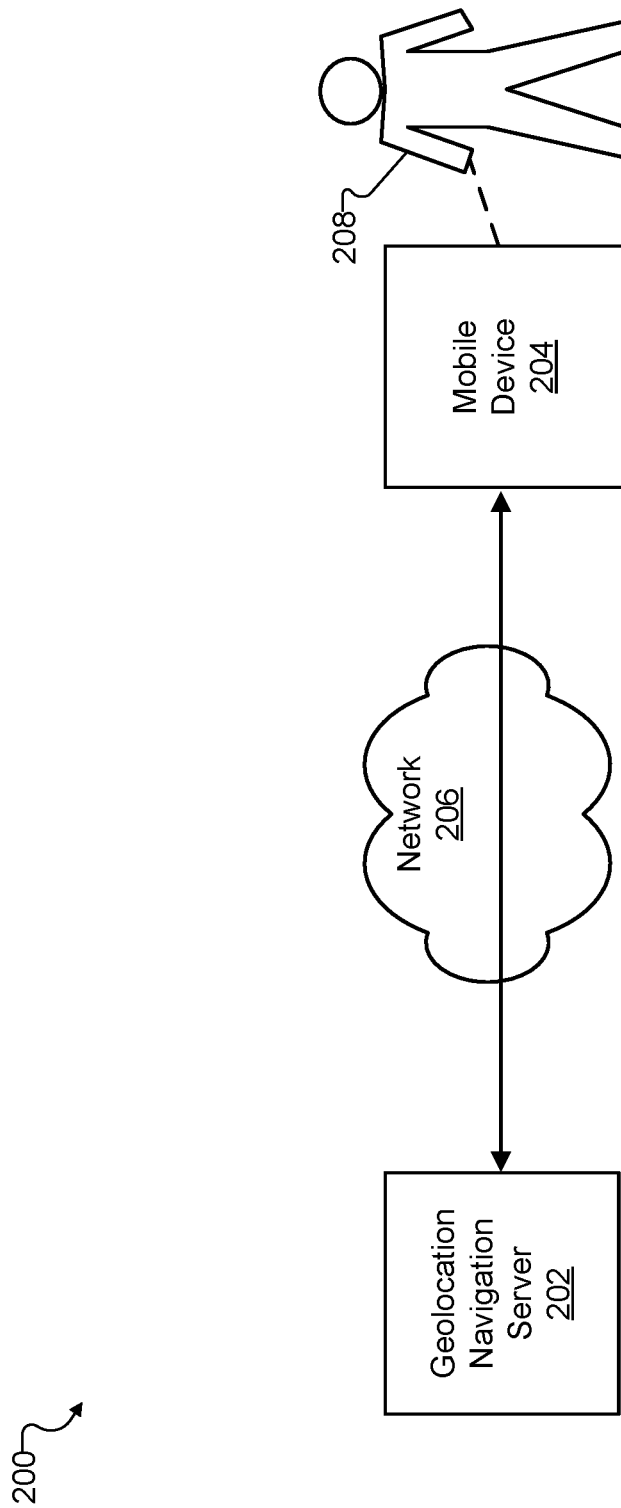
FIG. 2 illustrates an exemplary configuration in which the geospatial navigation system of FIG. 1 may operate to surface a user-customized segment within a geospatial navigation application according to principles described herein.

FIG. 2 illustrates an exemplary configuration 200 in which system 100 may operate to surface a user-customized segment within a geospatial navigation application. As shown in configuration 200, a geospatial navigation server 202 is communicatively coupled with a mobile device 204 by way of a network 206. Mobile device 204 is associated with (e.g., being used by) a user 208.

Geospatial navigation server 202 may be implemented by one or more servers or other computing systems operated by a geospatial navigation service provider, a cellular network service provider, or the like. In some examples, geospatial navigation server 202 may fully or partially implement system 100. For example, geospatial navigation server 202 may store some or all of the data of storage facility 108 (e.g., including databases of point of interest information, interest segment information, user-customized segment information, etc.), which data may include data for user 208 as well as data for additional users associated with additional mobile devices (not explicitly shown). Additionally, geospatial navigation server 202 may store geospatial navigation application software which geospatial navigation server 202 may provide to mobile device 204 for download and installation by mobile device 204. By providing such software, geospatial navigations server 202 may, in some examples, be said to "direct" mobile device 204 to perform the operations included within the software instructions.

Network 206 may facilitate data delivery between server-side systems such as geospatial navigation server 202 and client-side systems such as mobile device 204 in a server-client data delivery architecture illustrated by configuration 200. As such, network 206 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks. Data may be distributed using any suitable communication technologies included within network 206. As such, data may flow between geospatial navigation server 202 and mobile device 204 using any communication technologies, devices, media, and protocols as may serve a particular implementation.

Mobile device 204 may be implemented as any type of mobile device capable of executing geospatial navigation application software to track its own geolocation, communicate with geospatial navigation server 202, and so forth. For example, mobile device 204 may be implemented by a mobile phone (e.g., a smartphone), a tablet device, a navigational device, a laptop computer, or the like. User 208 may carry and use mobile device 204 for any suitable purpose (e.g., work, recreation, navigation, etc.). Just as system 100 may be fully or partially implemented by geospatial navigation server 202, in the same or other examples, system 100 may be fully or partially implemented by mobile device 204. In one implementation, for instance, system 100 may directly perform the operations described above (e.g., "accessing" a user action report by directly detecting the user action and generating the user action report, "directing" the mobile device to perform operations by directly performing the operations, etc.) for user 208, but may use at least some information stored within databases managed by geospatial navigation server 202.

Regardless of the manner in which system 100 is implemented or the computing devices used to implement it, system 100 may include or have access to various data described above and as will now be illustrated in more detail.

Figure 3:
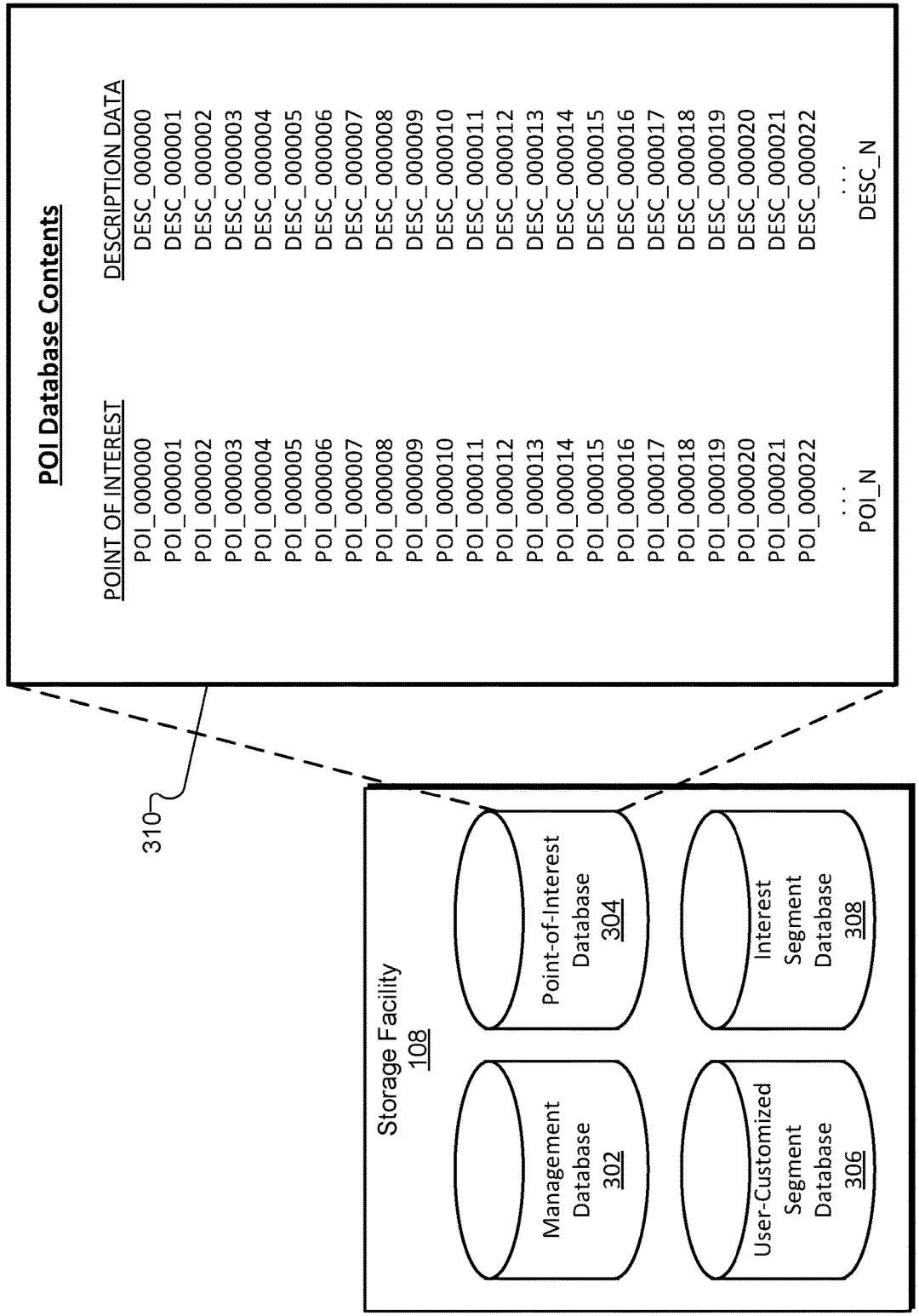
FIG. 3 illustrates exemplary contents of a point of interest database according to principles described herein.

As shown in FIG. 3, storage facility 108 may include various stores of data including a management database 302, a point of interest database 304, a user-customized segment database 306, and an interest segment database 308. While the data stores included within storage facility 108 are referred to as "databases" and are illustrated as being separate from one another, it will be understood that, in certain examples, the data stored within storage facility 108 may be stored using data structures and technologies not associated with conventional database technology. Additionally, it will be understood that databases 302 through 308 may, in certain examples, be implemented in a single integrated data store (e.g., a single database), multiple distinct data stores (e.g., multiple databases, as shown), or in any other manner as may serve a particular implementation.

FIG. 3 illustrates exemplary contents 310 of point of interest database 304. As shown, contents 310 include description data for a plurality of points of interest. Specifically, description data labeled DESC_000000 through DESC_N corresponds to different points of interest labeled POI_000000 through POI_N (where N is any suitable integer). In some examples, contents 310 may include a large number of points of interest (e.g., hundreds of thousands of points of interest, millions of points of interest, etc.). For instance, contents 310 may include most or all of the points of interest included within a particular geographic area (e.g., a city, a country, the entire world, etc.).

As used herein, a point of interest may include any named entity such as a restaurant or other such establishment, a retail store or other place of business, a government building, a park, a home or neighborhood, a church, or any other named entity associated with a particular location on a map and that may be of interest to users using the map (e.g., that may be searched for by the users, routed to by the users, visited by the users, etc.). As such, the points of interest included in the "POINT OF INTEREST" column shown within contents 310 may be distinguished and referred to by unique identifiers such as those shown, or in any other suitable way such as by name, address, or the like.

The description data shown under the "DESCRIPTION DATA" column of contents 310 may represent any suitable data for each point of interest. For example, each point of interest may be associated with one or more of each of the following, or any other suitable information: a name, a description, a geographic location (e.g., a street address, latitude and longitude coordinates, or the like), a phone number, a website, a ranking, a user review, hours of operation, a collection of photos and/or videos of the point of interest, a related point of interest, and so forth.

While each of the points of interest represented within point of interest database 304 may be known to system 100, it will be shown and made apparent that only a subset of these points of interest may be included within any particular user-customized segment or interest segment. This is because there may be a large number of points of interest that exist (and that therefore are included within point of interest database 304) that are not relevant to a particular user or to a particular interest category. Accordingly, one role of system 100 is to determine and continually develop and refine user-customized segments and interest segments to be relevance-scored subsets of the points of interest included in the overall point of interest database 304. To do this, system 100 may be configured to monitor various types of user actions with respect to any and all of these points of interest, as well as to identify relationships between points of interest in the ways described herein.

Figure 4:
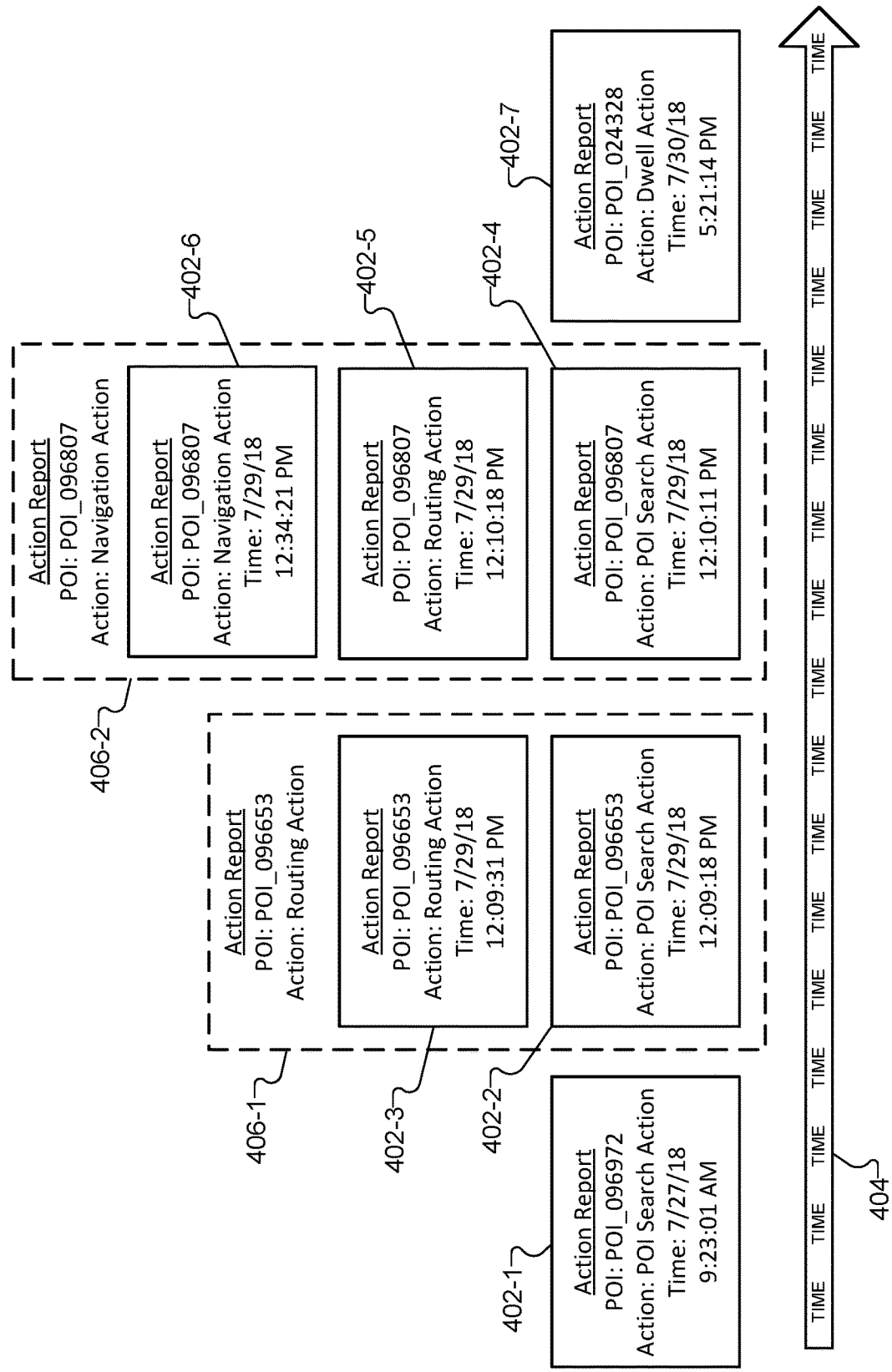
FIG. 4 illustrates exemplary action reports representative of actions taken by a user with respect to exemplary points of interest according to principles described herein.

To illustrate, FIG. 4 depicts exemplary action reports representative of actions taken by a user with respect to exemplary points of interest. For example, the user performing the actions represented by the action reports in FIG. 4 may be user 208, and the points of interest with respect to which the actions are taken may be included within contents 310 of point of interest database 304. As shown, various action reports 402 (e.g., action reports 402-1 through 402-7) are illustrated as being detected and reported at different points in time in accordance with a time period 404 that progresses from left to right across FIG. 4.

As shown, each action report 402 may include data indicating a particular point of interest (e.g. one of the points of interest included within point of interest database 304, represented with an identifier in the form of "POI_XXXXXX"), a particular action that user 208 has performed, and a timestamp (e.g., including a date and time) when the action was performed. It will be understood that the information shown in FIG. 4 is exemplary only, and that more, fewer, or different information fields may be included in action reports in other examples as may serve a particular implementation. Additionally, it will be understood that action reports 402 represent an abstraction of exemplary types of data that system 100 may access from a mobile device, but that the illustration of action reports 402 is not meant to imply that any particular data format or method of data transmission need be used by system 100 to access the type of information described herein.

As described above, the points of interest represented in each action report 402 may be any suitable points of interest that may be included within point of interest database 304 or that may exist in a geographic region that user 208 is interested in. Additionally, the action taken by user 208 and represented within a particular action report 402 may be any suitable action, such as those that will now be described. It will be understood that mobile device 204 may detect any of the actions described below and, in response to the detection of the actions, may generate the user action reports to be accessed by system 100.

One exemplary action that user 208 may take with respect to a particular point of interest may be a point of interest search action (labeled "POI Search Action" in action reports 402-1, 402-2, and 402-4) by way of which user 208 searches for a point of interest using a user interface of a geospatial navigation application. For example, user 208 may type or speak a name of a particular point of interest (e.g., a particular restaurant in one example) into the user interface and direct the geospatial navigation application to display any results that are associated with that point of interest. Once a particular point of interest has been searched for and found within the geospatial navigation application, another exemplary action that user 208 may take with respect to the point of interest may be a routing action by way of which user 208 directs the geospatial navigation application to present (e.g., within the user interface) a route from a starting location to a location of the first point of interest. For example, after searching for and finding a particular point of interest, the user may select that point of interest and direct the geospatial navigation application to determine a driving route, a walking route, a public transit route, or another suitable route to the selected point of interest from a particular starting location (e.g., from a present location of user 208, from a location associated with another point of interest searched for and selected in a similar way, etc.). Based on this route, yet another exemplary action that user 208 may take with respect to the point of interest is a navigation action by way of which user 208 navigates from the starting location to the location of the first point of interest by way of navigation information (e.g., step-by-step driving directions or the like) provided within the user interface by the geospatial navigation application.

Certain action reports 402 in FIG. 4 illustrate these types of actions as user 208 may perform them at different points in time. Specifically, as depicted by action report 402-1, user 208 may perform a point of interest search action for a point of interest designated "POI_096972" on Jul. 27, 2018, at 9:23:01 AM. In this case, user 208 may have wanted to see if POI_096072 (e.g., a particular store or restaurant) existed in his or her area, or where it was located, but may not have taken any additional action with respect to the point of interest at that time. However, two days later, on Jul. 29, 2018, action report 402-2 shows that user 208 searched for another point of interest ("POI_096653") at 12:09:18 PM, and that, a few seconds later, user 208 performed a routing action with respect to the same point of interest (action report 402-3). For example, after finding and selecting POI_096653, user 208 may have wished to see how long it would take to drive to POI_096653 or what the recommended route looked like.

Perhaps because POI_096653 was too far away, or would require a route with too much traffic, user 208 soon followed up with another point of interest search action depicted by action report 402-4 with respect to a point of interest designated "POI_096807." Here again, this point of interest search action is shown to be followed within seconds by a corresponding routing action for POI_096807 (shown by action report 402-5) in which user 208 may see where the point of interest is located and a route (e.g., including predicted traffic information in certain examples) to travel there. However, rather than returning to search for another point of interest in this case, action report 402-6 illustrates that user 208 next performs a navigation action to POI_096807 to arrive at the point of interest (and complete the navigation action) several minutes later at 12:34:21 PM.

An action report 402-7 generated the next day (Jul. 30, 2018) illustrates yet another type of action that user 208 may perform with respect to a point of interest. Specifically, as shown, user 208 may perform a dwell action with respect to a point of interest designated "POI_024328" in which the user dwells for at least a predetermined period of time at the point of interest. While not shown in this example, a dwell action may be performed after routing to a point of interest using the geospatial navigation application (e.g., after the navigation action of action report 402-6). However, user 208 need not use the geospatial navigation application to navigate to the point of interest in order to take an action with respect to the point of interest. Rather, a dwell action may be performed even if the user uses a different geospatial navigation application to navigate to the point of interest or does not use any geospatial navigation application to navigate to the point of interest. For example, if user 208 habitually spends a half hour at a coffee shop on the way to work each morning, user 208 may not use a geospatial navigation application to help him or her navigate to the coffee shop, but mobile device 204 may nonetheless generate a respective user action report similar to action report 402-7 each day to indicate that user 208 often performs the dwell action with respect to that point of interest. In this way, various aspects of these visits to the coffee shop (e.g., including which coffee shop it is, the location of the coffee shop, the time that the user goes to it each day, etc.) may be available to system 100 to facilitate the identification of other points of interest that might also be relevant to user 208, but with which user 208 may not be familiar.

While only a few specific user actions are illustrated by action reports 402, it will be understood that various other types of actions may also be performed and reported by a mobile device, and that any of these may be accessed by system 100 and used in the identification of additional points of interest that may be relevant to user 208. For example, while the point of interest search actions described herein may involve searching for specific points of interest (e.g., searching for a specific fast food restaurant called "ABC Burgers"), other similar search actions may involve searching for an interest category in which a point of interest is included (e.g., searching for "fast food restaurants").

Additionally, once a point of interest is searched for and selected, other actions beyond routing and navigating to the point of interest may also be detected and reported. For instance, user 208 may perform the action of following a web link presented within the user interface to learn more about the point of interest, or the like. Similarly, user 208 may perform an action of navigating to the point of interest by following one particular route out of several possible routes provided by the geospatial navigation application (e.g., a route that attempts to avoid traffic, a route that passes by other relevant points of interest, etc.). Additionally, along with actions for dwelling at a point of interest for a predetermined length of time, additional user actions may involve merely passing by the point of interest or navigating or dwelling near the point of interest.

In some examples, user action reports may be representative of actions in which a user provides information back to the geospatial navigation application about a point of interest. For instance, user 208 may rate a point of interest or provide a user review of the point of interest. Additionally, user 208 may capture a photograph or video of the point of interest from the street or from inside a building associated with the point of interest (e.g., a 360° panorama of the interior of the building). In some examples, user 208 may also perform actions related to providing information about particular aspects of the point of interest that may be of interest to other users, such as the menu of a restaurant, the showtimes of a movie theater, the admission prices of an amusement park, or the like.

As mentioned above, and as will be described and illustrated in more detail below, user-customized segments and/or interest segments may be updated by system 100 based on user action reports and additional points of interest identified based on the action reports. In some examples, the updating may include increasing prominence scores of the points of interest within the segments based on the user actions that have been reported. For instance, each type of user action may be associated with a particular increase (e.g., point increase, percentage increase, etc.) that is to be applied to a prominence score corresponding to the point of interest with respect to which the user action is taken. A prominence score corresponding to a particular point of interest within a user-customized segment may be increased by one amount if the first action is a point of interest search action, by a different amount if the first action is the routing action, by yet another amount if the first action is the navigation action, and so forth. For example, the amount associated with a navigation action may be greater than that associated with a routing action, which may be greater than the amount associated with a point of interest search action.

Because certain actions may tend to be performed together (e.g., routing actions may often be performed directly after searching actions, dwelling actions may commonly follow navigation actions, etc.), certain action reports may be grouped together for purposes such as prominence score increases. To illustrate, FIG. 4 shows two different action groups 406 (i.e., action groups 406-1 and 406-2), which each include a grouping of a plurality of action reports. Grouped action reports may represent different actions performed with respect to a common point of interest at related times. For instance, as depicted in FIG. 4, action group 406-1 is a routing action group that includes both a point of interest search action report (i.e., action report 402-2) and a routing action report (i.e. action report 402-3) occurring a few seconds apart. As another example, action group 406-2 is a navigation action group that includes a point of interest search action report (i.e., action report 402-4), a routing action report (i.e., action report 402-5), and a navigation action report (i.e., action report 402-6). Rather than providing prominence score increases for each of these action reports individually, certain implementations of system 100 may apply a single prominence score increase to a user-customized segment based on the entire routing action group 406-1, the entire navigation action group 406-2, or the like.

Figure 5:
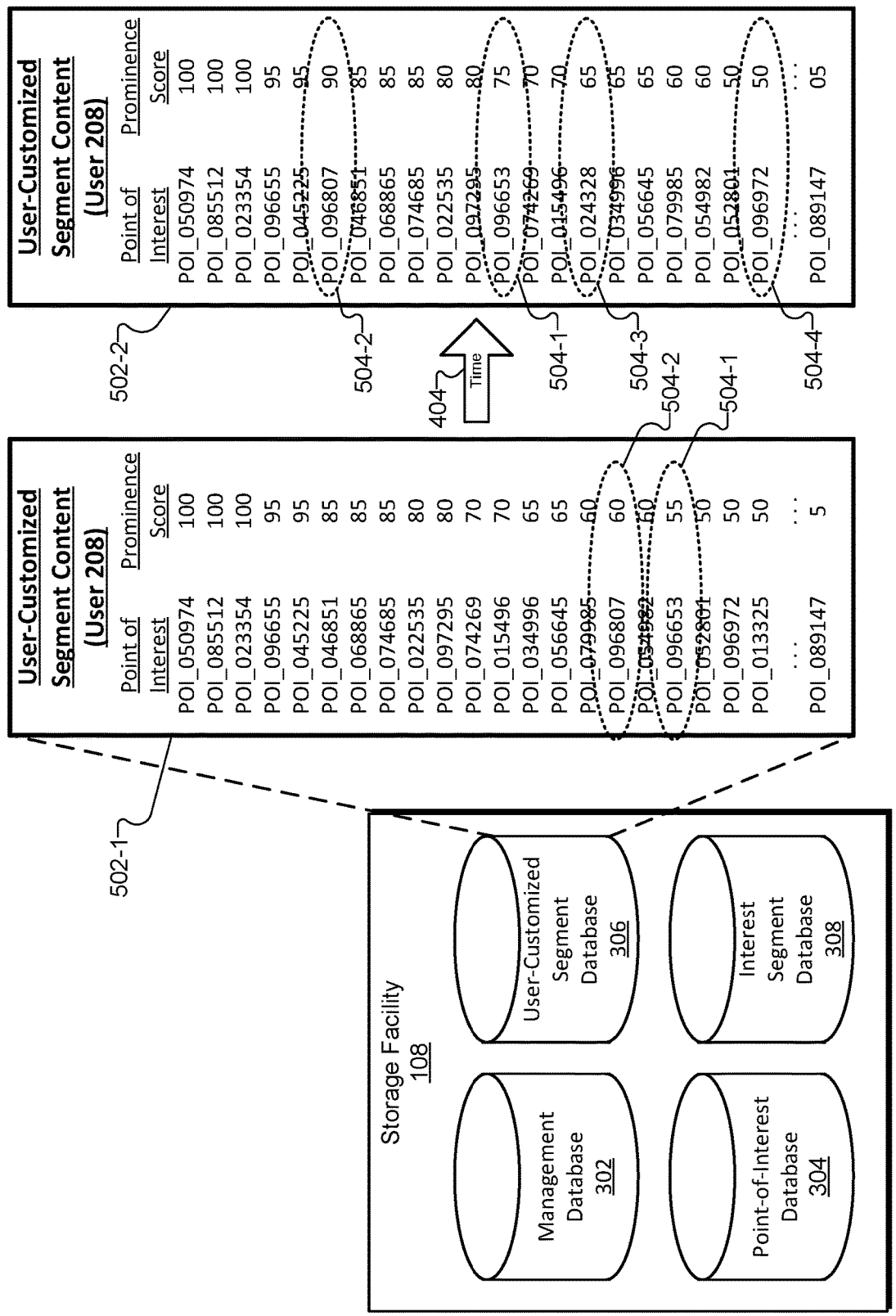
FIG. 5 illustrates exemplary contents of a user-customized segment database before and after a user-customized segment is updated based on the user action reports of FIG. 4 according to principles described herein.

FIG. 5 illustrates an exemplary user-customized segment stored within storage facility 108 of system 100, as mentioned above. Specifically, as shown in FIG. 5, exemplary contents 502 of user-customized segment database 306 are depicted before (i.e., content 502-1) and after (i.e., contents 502-2) updates are made based user action reports 402 of FIG. 4. (Time period 404 is shown in FIG. 5 to indicate that contents 502-1 represent the contents of the user-customized segment prior to the actions represented within time period 404 in FIG. 4, and that contents 502-2 represent the contents of the user-customized segment subsequently to those actions.)

As shown in contents 502-1 and 502-2 of FIG. 5, the user-customized segment customized with respect to user 208 may include a plurality of points of interest 504 (e.g., points of interest 504-1 through 504-4, as well as various other points of interest not explicitly labeled) that are each associated with a respective prominence score. Each of points of interest 504 represented in the user-customized segment may be a point of interest that has been determined to have at least some relevance for user 208, although, as indicated by the different prominence scores (arbitrarily going from a score of 5 to 100 in this particular example), certain points of interest may be more relevant to user 208 than others, thereby making them more prominent in the user-customized segment. The prominence scores shown in the user-customized segment will be understood to represent an objective measure of how prominently the point of interest is to be surfaced in a user interface presented to user 208, and may thus be based, for instance, on how relevant each point of interest has been determined to be to user 208.

As such, the prominence scores within the user-customized segment may be understood to change (e.g., increase and/or decrease) over time as user behavior is detected and reported with respect to different points of interest 504 within the user-customized segment and/or with respect to different points of interest not yet included within the user-customized segment. For example, as shown in contents 502-1 of the user-customized segment (i.e., the contents prior to time period 404), a point of interest 504-1 associated with the point of interest designated POI_096653 has a prominence score of 55, and another point of interest 504-2 associated with the point of interest designated POI_096807 has a prominence score of 60. However, after system 100 accesses user action reports 402 associated with these points of interest and updates the user-customized segment to increase the prominence scores corresponding to these points of interest, contents 502-2 illustrate that the prominence score of point of interest 504-1 is increased to 75, and that the prominence score of point of interest 504-2 is increased 90.

Additionally, while the points of interest designated POI_024328 and POI_096972 are not shown to be included within the user-customized segment prior to time period 404 (see contents 502-1), contents 502-2 show that these points of interest may be added to the user-customized segment after time period 404 (e.g., based on the action reports 402 associated with these points of interest), as points of interest 504-3 and 504-4, respectively.

While each of the labeled points of interest 504 described up to this point may be added to, or made more prominent within, the user-customized segment based on user actions reported directly for those respective points of interest, it will be understood that one or more additional points of interest may also be added to the user-customized segment, even if user 208 has not been detected to perform a particular user action (or, in some examples, any user action) with respect to these points of interest. For example, such additional points of interest may be newly added to (i.e., included within) the user-customized segment without a prominence score assigned (i.e., or, effectively, with a prominence score of zero).

System 100 may identify such additional points of interest from the point of interest database in any manner as may serve a particular implementation. For example, each point of interest may be associated with one or more attributes (e.g., a type of the point of interest, a geographical location of the point of interest, an average price range associated with the point of interest, etc.), and additional points of interest may be identified based on sharing attributes with points of interest already included within the user-customized segment (i.e., points of interest with respect to which user 208 has been reported as having taken certain user actions). In certain examples, each point of interest included within point of interest database 304 may be classified and categorized using a classification system such as the standard industry classification ("SIC") system, a proprietary classification system used by system 100, or the like. In these examples, additional points of interest may thus be identified and included within the user-customized segment based on their presence within the same or similar classification categories with points of interest 504.

Prominence scores for these additional new points of interest being added to the points of interest 504 included within the user-customized segment for user 208 may be assigned prominence scores according to various factors similar to those described above for scoring the points of interest 504 for which direct user actions have been reported. Because the respective prominence scores for these new points of interest may be effectively zero when they are first being added to the user-customized segment, assigning prominence scores to these points of interest may also be referred to herein as "increasing" their prominence scores (i.e., from zero to the newly assigned non-zero scores).

Assigning new prominence scores (or making such increases) may be performed in any suitable way. For example, as part of identifying a new point of interest to be added to the user-customized segment (i.e., a new point of interest for which a direct user action has not been reported), system 100 may determine a relevance score for the new point of interest that represents a degree of relevance of the new point of interest with respect to one or more of the points of interest 504 already included within the user-customized segment. The updating of the user-customized segment to assign the prominence score to the new point of interest (i.e., to increase the prominence score up from zero) may be performed by setting the score to an amount (or increasing the score by an amount) that is determined based on the relevance score.

The relevance score for the new point of interest may be determined based on various different types of relevance factors. For example, the relevance score may be influenced by a similarity factor that represents how closely related the new point of interest is to one or more of points of interest 504. For example, the similarity factor may account for a number of classification codes shared by both the new point of interest and one or more points of interest 504. As another example, the relevance score may be influenced by a proximity factor that represents how proximate a geographical location of the new point of interest is to one or more locations of one or more points of interest 504 already included in the user-customized segment. For example, a new point of interest may be assigned a higher relevance score if it is nearby several points of interest 504 that are themselves prominent and often visited by user 208 than if the new point of interest is in a different part of town than user 208 usually spends time in. Yet another exemplary factor that may influence the relevance score is a prominence factor that represents an average prominence score corresponding to the new point of interest. Specifically, the average prominence score may be determined based on a plurality of prominence scores within a plurality of other user-customized segments (i.e., user-customized segments that include the new point of interest and that are customized with respect to a plurality of additional users besides user 208).

Various other relevance factors similar to those described above may similarly influence the relevance score in certain implementations. For instance, an objective measure of the quality of the new point of interest (e.g., based on user or critical reviews, etc.), how well-known or well-liked the point of interest is by known contacts (e.g., friends, family, etc.) of user 208, and so forth, may also factor in to the relevance score. Additionally, any suitable combination of the factors described above (and/or other suitable factors) may be employed in determining the relevance score.

In certain implementations, it may be useful to organize and arrange points of interest not only in accordance with user-customized segments, but also in accordance with categorized groupings of related points of interest referred to herein as "interest segments." Organizing similar or related points of interest by category into interest segments in the ways described herein may facilitate, for example, the identification of additional points of interest to be included within user-customized segments, the updating of user-customized segments, and so forth. For example, the identifying of a new point of interest to be included in the user-customized segment illustrated in FIG. 5 may be performed by accessing data associated with an interest segment customized with respect to a particular interest category, determining that the new point of interest is likely to be relevant to the user, and, based on that determination, identifying the new point of interest. Specifically, system 100 may access the interest segment data based on the user action report by identifying one or more interest segments associated with the action represented by the user action report and accessing one of them. The accessed interest segment may not only include the point of interest represented in the action report, but may also include the new point of interest (e.g., because both points of interest are related to the category around which the interest segment is built). Accordingly, system 100 may determine that the new point of interest is likely to be relevant to the user based on the accessed interest segment data at least because of the fact that the new point of interest is included in an interest category in which user 208 has demonstrated at least some interest.

Figure 6:
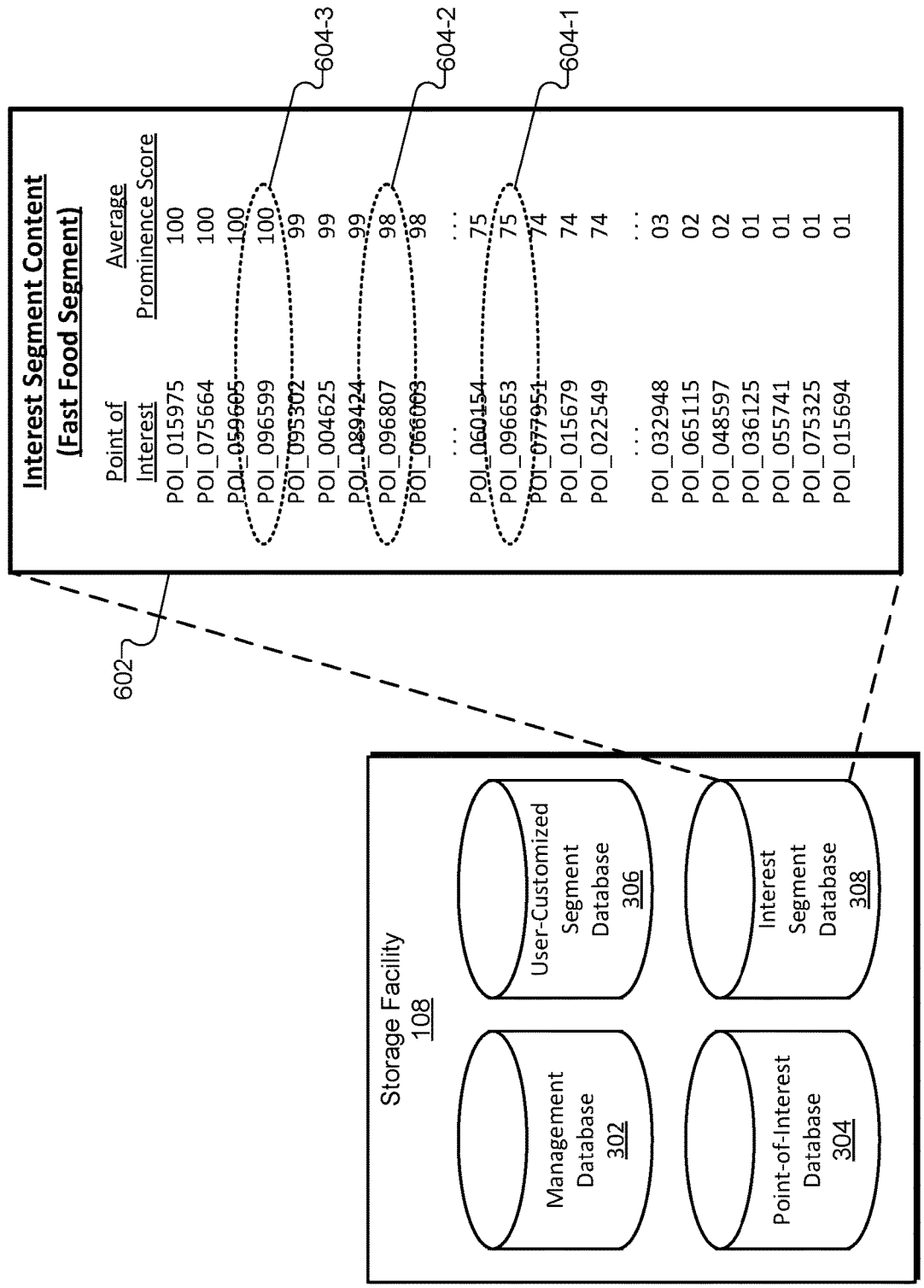
FIG. 6 illustrates exemplary contents of an interest segment database according to principles described herein.

To illustrate an interest segment, FIG. 6 depicts exemplary contents 602 of interest segment database 308. As indicated, contents 602 may represent a particular interest segment associated with a particular interest category, in this case "fast food." Accordingly, each of the points of interest included within the illustrated interest segment may represent a different fast food restaurant. As shown, each point of interest included within the interest segment may be associated with data such as an "Average Prominence Score" or any other information as may serve a particular implementation. As mentioned above, for example, the average prominence score may be derived from respective prominence scores assigned to each point of interest by user-customized segments that include the points of interest. Thus, it may be assumed that points of interest having a very high average prominence score (e.g., of 100 or thereabouts on the arbitrary scoring scale used in this example) are popular points of interest that are well-loved by many people and likely to be enjoyed by others who have an interest in that type of point of interest. Similarly, it may be assumed that a point of interest having a lower average prominence score may be less appreciated by those familiar with it, may be a newly-opened point of interest that has not yet had time to build a loyal following, or the like.

As shown, two of the restaurants with respect to which user 208 has taken an action are included within the fast food interest segment of FIG. 6. Specifically, as shown, a point of interest 604-1 (corresponding to POI_096653) and a point of interest 604-2 (corresponding to POI_096807) correspond, respectively, to points of interest 504-1 and 504-2 that were shown to be included and given prominence score increases in FIG. 5. A third point of interest 604-3 labeled in FIG. 6 (i.e., corresponding to a POI_096599) is not shown to yet be included within the user-customized segment illustrated in FIG. 5. However, as shown, point of interest 604-3 appears to be well regarded by those familiar with it, based on its average prominence score of 100. Additionally, other relevant attributes of point of interest 604-3 may be recognized by system 100, such as that point of interest 604-3 is nearby other restaurants with which user 208 is already familiar, that point of interest 604-3 is located closer to user 208 than are the other restaurants, or the like. Accordingly, system 100 may determine that user 208 is likely to find point of interest 604-3 relevant based on user action reports 402 and/or the user-customized segment of FIG. 5, and may automatically add point of interest 604-3 to the user-customized segment along with a newly assigned prominence score as described above. For example, the prominence score may be relatively low to begin with but may increase as user 208 is reported to have performed actions with respect to point of interest 604-3 (e.g., when user 208 routes to the restaurant the first time, after user 208 dwells at the restaurant several times, etc.).

Once the user-customized segment is built up in the ways described above (e.g., including by employing interest segments to help add points of interest to the user-customized segment that the user has never been reported to take action on), the user-customized segment may be surfaced in various ways. As used herein, a user-customized segment is said to be "surfaced" within a user interface of a geospatial navigation application when the points of interest included within the user-customized segment are emphasized (e.g., highlighted, prioritized, etc.) in some way over other points of interest not included within the user-customized segment. In some examples, along with emphasizing points of interest included within the user-customized segment over points of interest not included within the user-customized segment, surfacing a user-customized segment may further include emphasizing points of interest in accordance with respective prominence scores of each point of interest. For example, points of interest having high prominence scores may be emphasized over points of interest with lower prominence scores within the same user-customized segment.

When a user-customized segment is surfaced within a user interface, the points of interest included within the user-customized segment may be emphasized within the user interface in any manner as may serve a particular implementation. As one example, emphasized points of interest (i.e., those included within the user-customized segment and/or having relatively high prominence scores) may be listed before non-emphasized points of interest (i.e., those not included within the user-customized segment and/or having relatively low prominence scores) in listings of points of interest presented to the user. Such listings may include search results of queries made by the user, listings of a particular type of point of interest (e.g., an interest segment listing), or the like. Additionally or alternatively, emphasized points of interest may be given prominence or prioritization in other ways within point of interest search algorithms employed by the geospatial navigation application.

As another example, representations of emphasized points of interest may be presented differently than non-emphasized points of interest on a map included within the user interface. For instance, emphasized points of interest may be made to be distinctive, to stand out, to be easier to select, etc., by being presented or decorated with different icons (e.g., different icon shapes, different icon sizes, different icon colors, etc.), different text (e.g., text of different colors, different fonts, etc.), and so forth.

FIGS. 7A through 8B illustrate some of these and other exemplary ways of surfacing a user-customized segment in a user interface of an exemplary geospatial navigation application. Specifically, each of FIGS. 7A through 8B shows a user interface 702 of a geospatial navigation application presented by mobile device 204. In each figure, user interface 702 includes a map displaying search results for a search query entered in a search box 704. Specifically, the search query is shown to be for "fast food restaurants." As will now be described, the presentation of the search results in each of FIGS. 7A through 8B illustrates a different manner of surfacing a user-customized segment in which restaurants called "ABC Burgers" and "XYZ Burgers" are included within the user-customized segment with relatively high prominence scores, while other restaurants in the search results are either not included within the user-customized segment or have lower prominence scores.

Figure 7A:
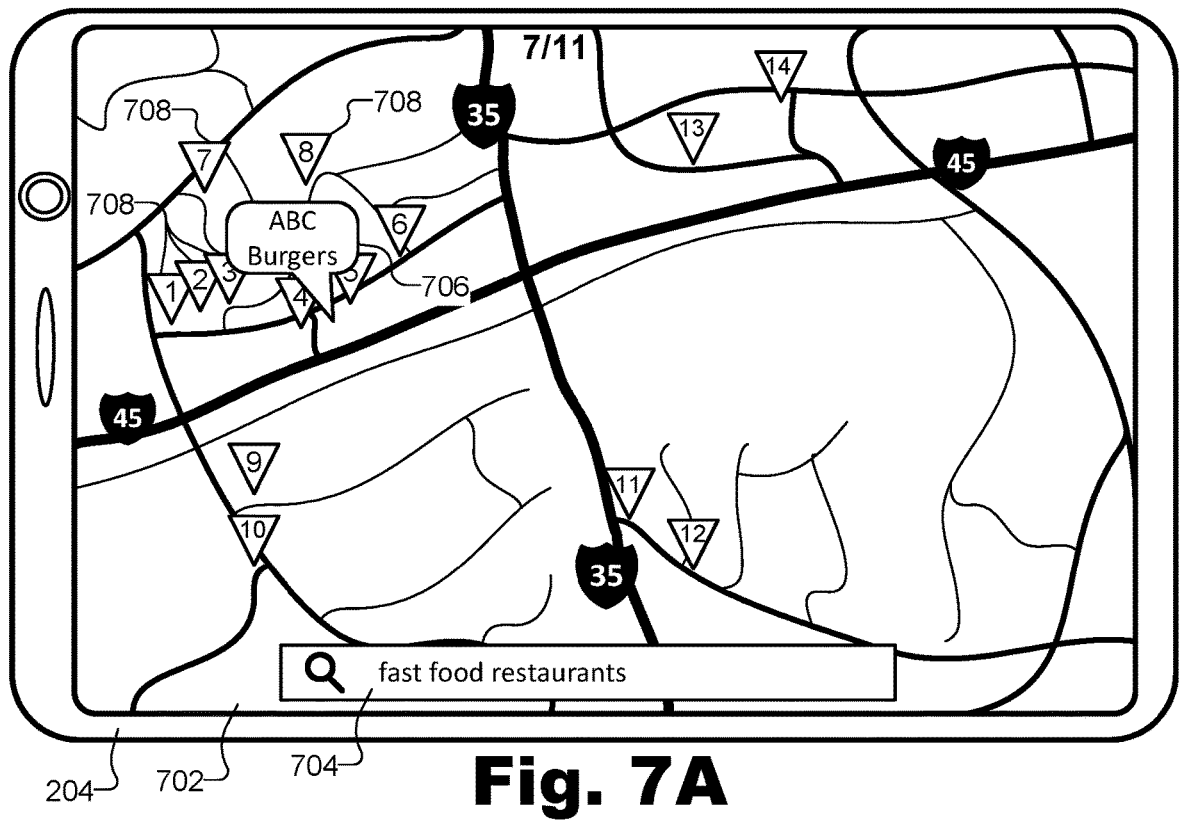
FIGS. 7A through 8B illustrate exemplary ways of surfacing a user-customized segment on a user interface of an exemplary geospatial navigation application according to principles described herein.

FIG. 7A illustrates an icon 706 that acts as a representation of the ABC Burgers point of interest and is emphasized over various icons 708 acting as representations of other restaurants within a bounding box of the search area (i.e., within the area presently shown on the screen of mobile device 204). As shown, icon 706 is larger and more prominent than any of icons 708. At the zoom level shown, only icon 706 includes text specifically denoting the name of the represented point of interest, while icons 708 merely indicate that other fast food restaurants are present. While not explicitly shown in FIG. 7A, icon 706 may be further emphasized over icons 708 in other ways such as by employing different colors, animations, or the like.

Figure 7B:
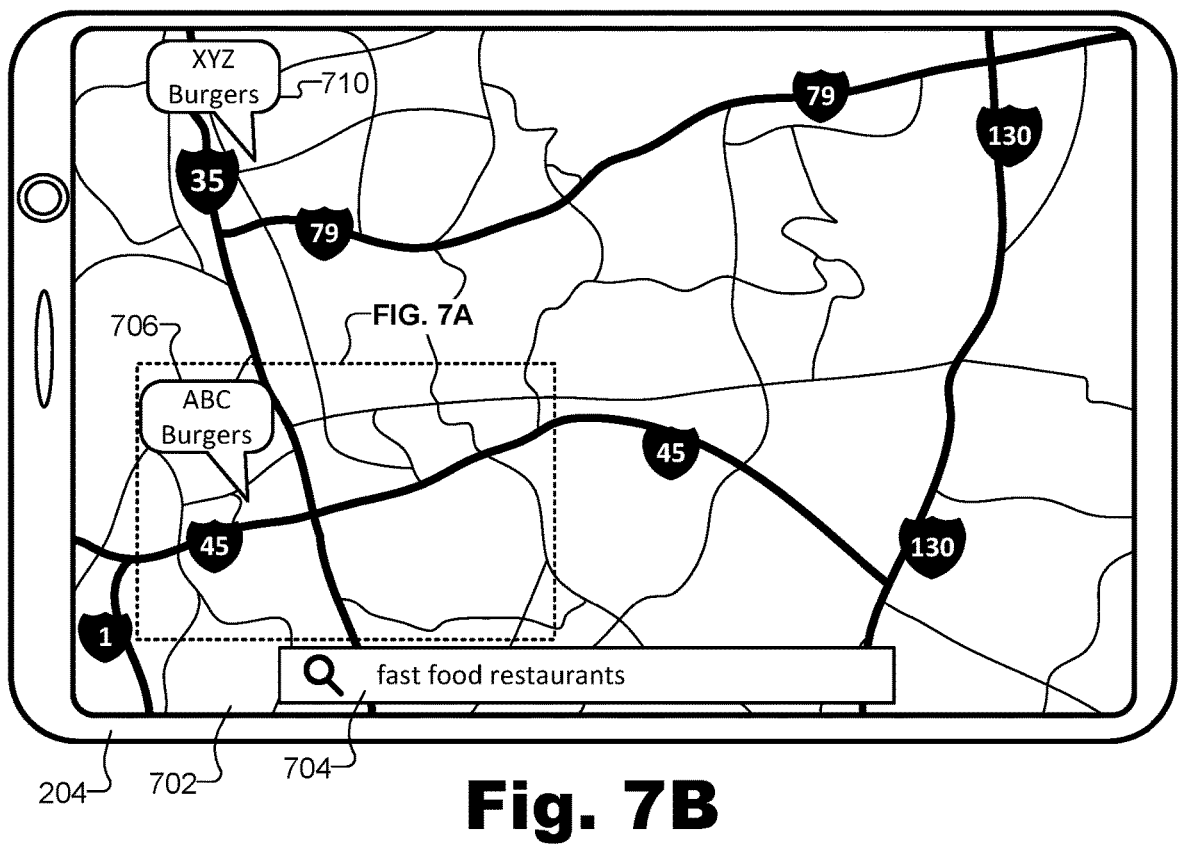

FIG. 7B illustrates the same map as FIG. 7A but with a wider zoom level (i.e., with a bounding box and search area that cover a larger geographic area). To illustrate, a dotted box is labeled "FIG. 7A" in FIG. 7B to show the bounding box represented within FIG. 7A, and to thereby illustrate how much FIG. 7B has been zoomed out from the search area of FIG. 7A. In FIG. 7B, the points of interest of the user-customized segment are shown to be emphasized over other points of interest by being displayed at zoom levels at which non-emphasized points of interest are not displayed. Specifically, in FIG. 7B, system 100 may direct mobile device 204 to emphasize icon 706 (i.e., the representation of the ABC Burgers point of interest), as well as an icon 710 (i.e., the representation of the XYZ Burgers point of interest), by directing the geospatial navigation application to represent these points of interest on the map when the zoom level of the map is such that the additional points of interest (e.g., those represented by icons 708 in FIG. 7A) are not represented on the map.

Figure 8A:
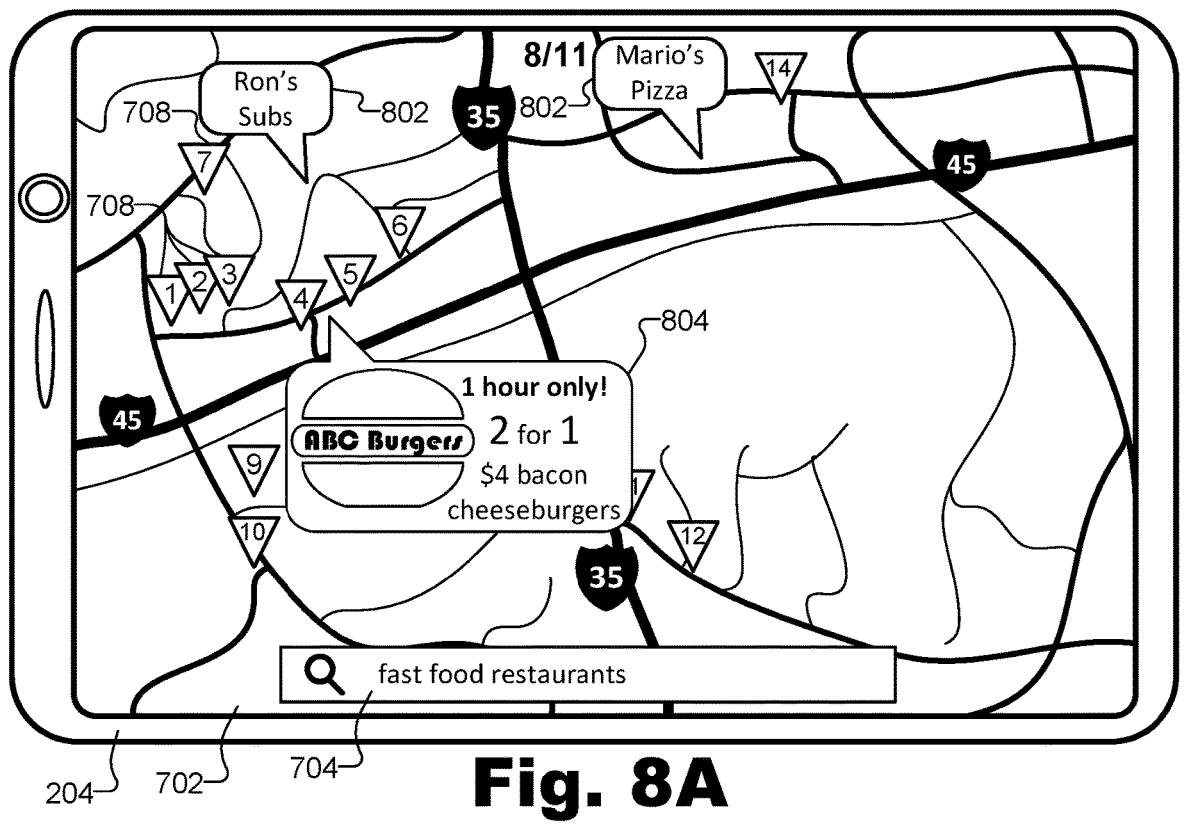

FIG. 8A illustrates an exemplary way to emphasize two different types of points of interest that are both included within the user-customized segment. Specifically, in FIG. 8A, points of interest with relatively low prominence scores are depicted along with representations of points of interest with relatively high prominence scores. Additionally, points of interest that are not included within the user-customized segment are also shown.

More particularly, as shown, a point of interest called "Ron's Subs" and a point of interest called "Mario's Pizza" are represented by respective icons 802 within user interface 702. These points of interest may be included within the user-customized segment but may have relatively low prominence scores in this example. As such, icons 802 are similar to icon 706 in FIGS. 7A and 7B and, as described above, may be used to clearly emphasize the respective points of interest over other points of interest represented by icons 708 (i.e., which, as described above, are not included within the user-customized segment at all). However, FIG. 8A further shows how a point of interest with a relatively high prominence score may be emphasized over points of interest that are included within the user-customized segment, but that have lower prominence scores. As shown, an icon 804 for ABC Burgers is even larger and more prominently displayed than icons 802. In this example, icon 804 includes a graphical logo of ABC Burgers, as well as information about a deal presently being offered to user 208 (i.e., "2-for-1 $4 bacon cheeseburgers for one hour only").

While icon 804 illustrates one particular type of deal displayed directly on the representation of the point of interest, it will be understood that other deals, coupons, advertisements, graphical content (e.g., photographs, videos, animations, etc.), and/or any other suitable representations adapted to draw the attention of user 208 to icon 804 or to entice user 208 to visit the point of interest associated with icon 804 may be employed as may serve a particular implementation. Additionally, in certain examples (e.g., if there is not room on the map to display offer or coupon content directly, if the size of icon 804 is too imposing on other map content, etc.), icon 804 may be distinguished from other icons such as icons 802 by flashing, by being a different color, or the like. In these examples, user 208 may know that by selecting a flashing icon, an icon of a particular color, etc., user 208 may be presented with an offer in a pop-up icon similar to icon 804.

Figure 8B:
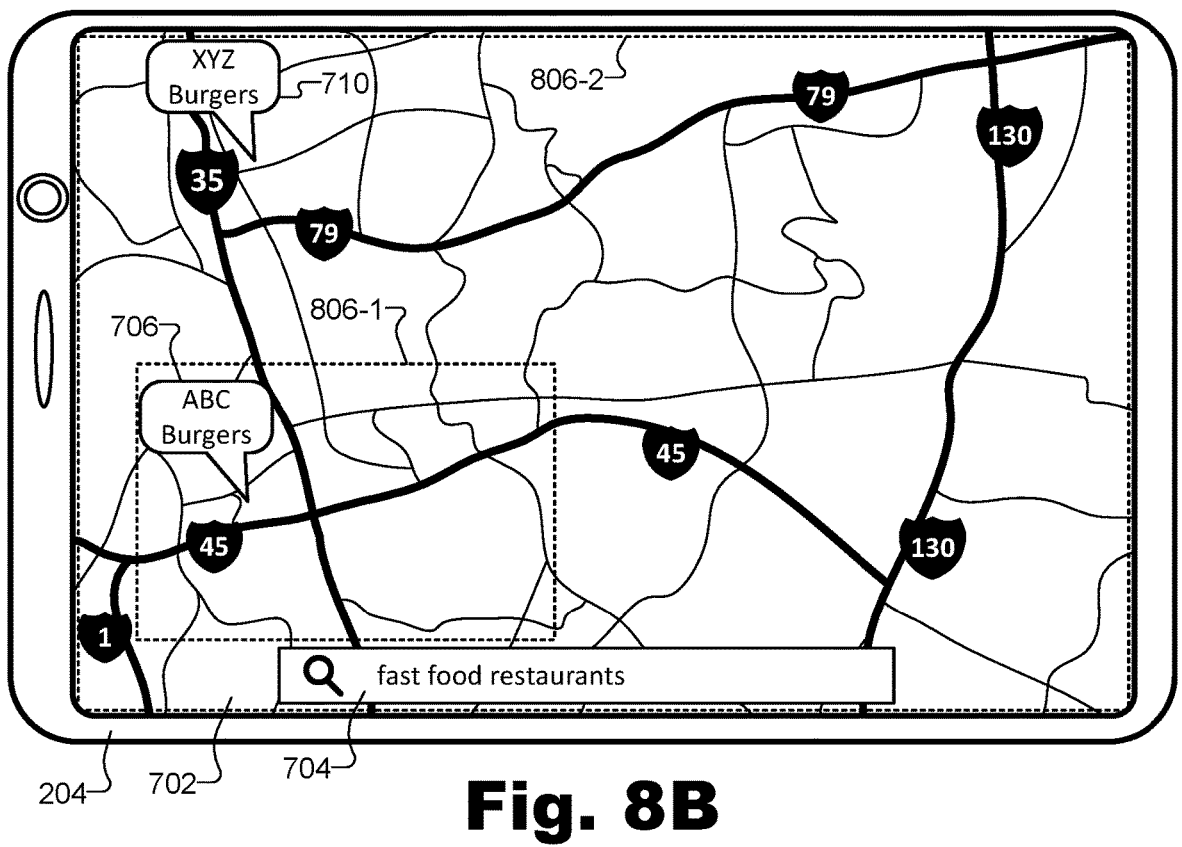

FIG. 8B illustrates yet another way to emphasize points of interest included within a user-customized segment. Specifically, in FIG. 8B, a custom bounding box is automatically imposed on the map to show and/or draw attention to emphasized points of interest. When points of interest (e.g., emphasized or non-emphasized points of interest) are outside of a bounding box of a map presented within user interface 702 due to a zoom level of the map, these points of interest are normally not displayed or presented to the user until the bounding box is adjusted to include the points of interest. For instance, referring to FIG. 8B, if a bounding box 806-1 is displayed (as was the case in FIG. 8A), a point of interest such as XYZ Burgers would not be represented on the map because it is outside of bounding box 806-1.

Accordingly, in certain examples, system 100 may direct the mobile device to emphasize the representations of certain points of interest by directing the geospatial navigation application to automatically adjust the zoom level of the map to include the emphasized points of interest within the bounding box of the map while abstaining from automatically adjusting the zoom level of the map to include the other (non-emphasized) points of interest within the bounding box of the map. Specifically, for example, if the bounding box was bounding box 806-1 (as shown in FIG. 8A) when user 208 performed the search for "fast food restaurants," system 100 may direct the geospatial navigation application to automatically adjust the map (e.g., by automatically adjusting the zoom level, by automatically panning the map, etc.) to a bounding box 806-2 shown in FIG. 8B. In this way, not only is icon 706 shown representing ABC Burgers, but icon 710 is also shown representing XYZ Burgers. In other examples, rather than automatically adjusting the zoom level or automatically panning the bounding box from one area to another, system 100 may show an indicator (e.g., at the edge of the screen) indicating that an important point of interest is located just out of the current bounding box and may be seen by user 208 if desired, by user 208 manually panning toward it, manually zooming out, or the like.

Points of interest and respective prominence scores in the user-customized segment for user 208 may be built up and developed over time as user 208 is detected to perform various different user actions with response to various different points of interest. Accordingly, the development of the user-customized segment may progress more speedily and accurately the more that user 208 uses the geospatial navigation application to perform navigation-related and point-of-interest-related tasks in her or her life. For instance, it the geospatial navigation application is used for only the purpose of searching for restaurant options, the user-customized segment may eventually develop to represent the preferences of user 208 very effectively with regard to restaurants, but may not represent well the preferences of user 208 with respect to other non-restaurant interests such as, for example, where user 208 prefers to shop for clothing. Conversely, if user 208 uses the geospatial navigation application for various aspects of his or her life, the user-customized segment may eventually grow to be very detailed and useful to user 208, and may have significant predictive power as user 208 uses the geospatial navigation application to search for and navigate to various points of interest.

Consequently, a feedback loop may be formed where a geospatial navigation application becomes more customized to a user's preferences the more the user uses the geospatial navigation service, and the user is more inclined to use the geospatial navigation service the more the application becomes customized to his or her preferences. To illustrate, FIG. 9 shows an exemplary flow diagram 900 depicting how systems and methods described herein serve to improve a geospatial navigation service so as to benefit users and providers of the geospatial navigation service.

As shown, various events 902 (i.e., events 902-1 through 902-4) may lead to other events 902, as indicated by arrows between respective events 902. Specifically, in event 902-1, a user may choose to use a geospatial navigation application (i.e., to access and make use of a geospatial navigation service). When the user selects the geospatial navigation application in event 902-1, this may lead to the user taking one or more actions, using the geospatial navigation application, with respect to various points of interest. For example, the user may search for, route to, navigate to, and/or dwell at various points of interest using the geospatial navigation application. Additionally or alternatively, the user may perform actions involving providing data (e.g., photos, ratings, reviews, etc.) to the geospatial navigation service.

As illustrated, when the user takes actions with respect to points of interest in event 902-2, this may lead to an event 902-3 in which the geospatial navigation application and/or service improve. For example, by receiving action reports from the user, system 100 may develop a robust user-customized segment for the user, thereby improving and better customizing the navigation experience for that user. Additionally, by receiving more data about more points of interest (e.g., including the photos, rating, reviews, etc., described above), system 100 may improve the geospatial navigation service for other users as well (e.g., by being able to provide street view, internal views, rating information, user reviews, and so forth to the other users). Accordingly, as the service improves, event 902-3 may lead to further occurrence of event 902-1, in which the user continues to choose the geospatial navigation service or application for his or her navigation needs because he or she finds the service and application to be effective, customized, and useful.

While events 902-1 through 902-3 may naturally form the positive feedback loop described above to continuously encourage more usage of the geospatial navigation service while continuously improving the geospatial navigation service, it may be appropriate, in certain examples, to add a fourth event 902-4 to help jumpstart and/or accelerate the positive feedback function of the loop formed by events 902-1 through 902-3. For example, as shown, event 902-4 may involve providing, by the geospatial navigation application and/or service, additional incentive to the user to use the geospatial navigation application and/or service. Specifically, for instance, the incentives provided may be aimed to make using the geospatial navigation service and application more fun and rewarding for the user.

The incentivizing of the user associated with event 902-4 may take any form as may serve a particular implementation. For instance, the geospatial navigation application may offer a point system whereby users may earn points (or money, miles, prizes, etc.) for taking certain actions using the geospatial navigation application or service. Users may earn different numbers of points, for example, for searching for certain points of interest, routing to certain points of interest, navigating to certain points of interest (e.g., by way of particular routes provided by the geospatial navigation service), dwelling at certain points of interest, or the like. Additionally, users may earn points by providing information that helps improve the geospatial navigation service such as photos or videos of points of interest, ratings or reviews of points of interest, sharing the geospatial navigation application with a friend, and so forth. Based on these points, users may earn free or discounted prizes (e.g., new mobile devices), entertainment (e.g., free mobile applications, in-application mobile purchases, etc.), services (e.g., cellular services, data plans, etc.), food or drink (e.g., restaurant gift cards, etc.), or any other suitable prizes or rewards as may serve a particular implementation.

In some examples, whether a point of interest is included within a user-customized segment may determine how many points a user may earn by performing actions with respect to the point of interest. For example, users may be incentivized to try new points of interest they have not searched for or visited before, or users may be incentivized to return to other points of interest that they have already shown an interest in. Similarly, the prominence scores of respective points of interest within a user-customized segment may similarly affect how many points may be offered for taking an action with respect to the points of interest.

As shown in FIG. 9, when incentives are provided to users for using the geospatial navigation service and application (i.e., in event 902-4), events such as event 902-1 (the user choosing the geospatial navigation application) and event 902-2 (the user taking actions with respect to points of interest) may be more likely to occur. In turn, when the user takes such actions, the user benefits and receives rewards (e.g., points). As such, event 902-4 may help kickstart a pattern of usage and application improvement that can eventually sustain itself without the incentivizing of event 902-4, and event 902-4 may thus be only a temporary part of flow diagram 900. Alternatively, event 902-4 may be used permanently as a way of accelerating and maintaining user engagement with the geospatial navigation service.

Figure 10:
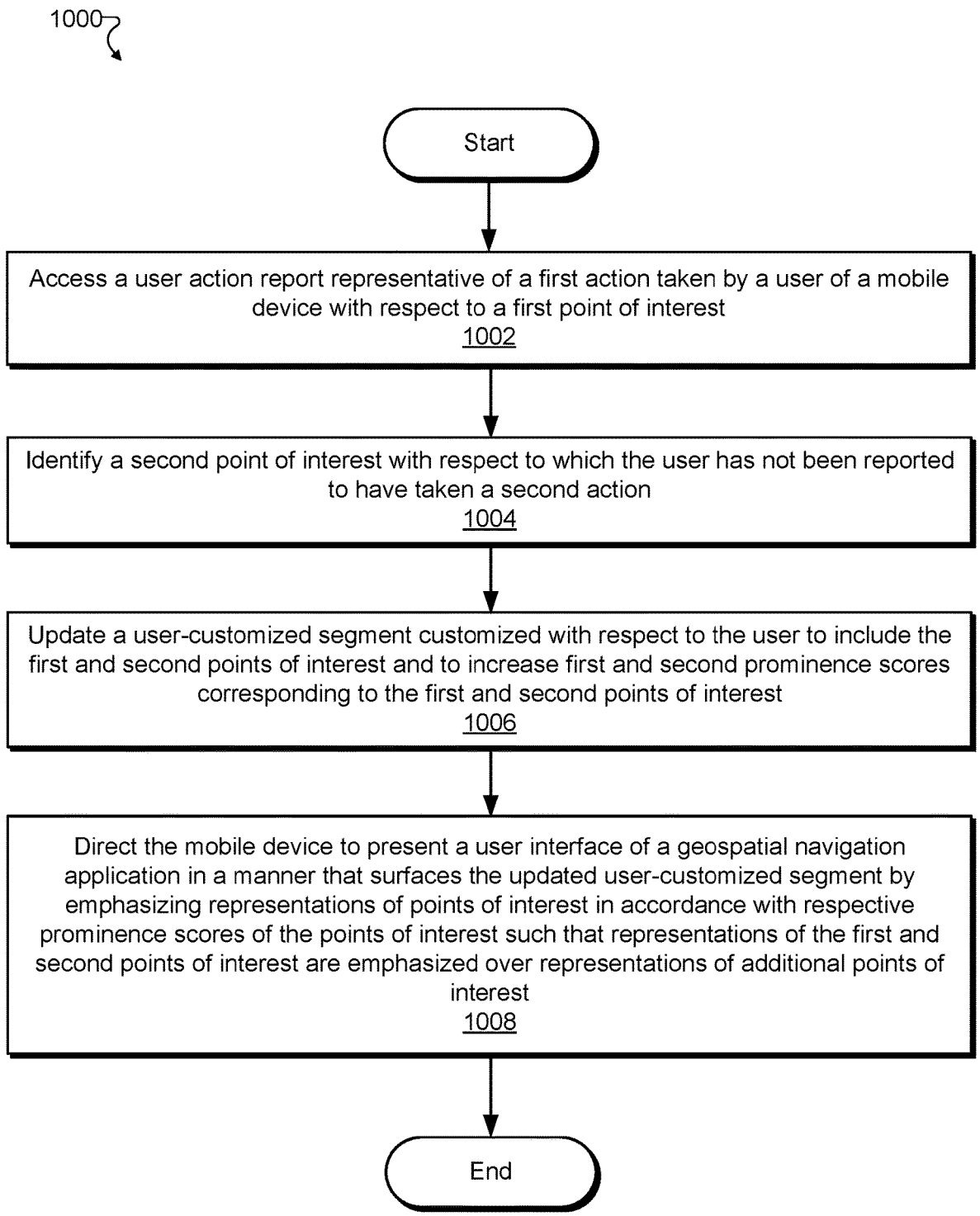
FIG. 10 illustrates an exemplary method for surfacing a user-customized segment within a geospatial navigation application according to principles described herein.

FIG. 10 illustrates an exemplary method 1000 for surfacing a user-customized segment within a geospatial navigation application. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

In operation 1002, a geospatial navigation system may access a user action report representative of a first action taken by the user with respect to a first point of interest. For example, the geospatial navigation system may access the user action report from a mobile device used by a user. The first point of interest represented in the first user action report may be included in a plurality of points of interest for which data is stored in a point of interest database accessible to the geospatial navigation system. Operation 1002 may be performed in any of the ways described herein.

In operation 1004, the geospatial navigation system may identify a second point of interest with respect to which the user has not been reported to have taken a second action. For example, the geospatial navigation system may identify the second point of interest based on the user action report accessed in operation 1002. As with the first point of interest, the second point of interest may be included in the plurality of points of interest for which data is stored in the point of interest database. Operation 1004 may be performed in any of the ways described herein.

In operation 1006, the geospatial navigation system may update a user-customized segment customized with respect to the user to include the first and second points of interest and to increase, within the user-customized segment, respective prominence scores corresponding to the points of interest. For example, the geospatial navigation system may update the user-customized segment based on the user action report accessed in operation 1002 and based on the identifying of the second point of interest in operation 1004. The prominence scores corresponding to the points of interest may include, specifically, a first prominence score corresponding to the first point of interest and a second prominence score corresponding to the second point of interest. Operation 1006 may be performed in any of the ways described herein.

In operation 1008, the geospatial navigation system may direct the mobile device to present a user interface of a geospatial navigation application in a manner that surfaces the user-customized segment updated in operation 1006. Specifically, for example, the geospatial navigation system may direct the user-customized segment to be surfaced by directing the user interface to emphasize representations of points of interest in accordance with respective prominence scores of the points of interest. For example, the representations may be emphasized such that representations of the first and second points of interest are emphasized over representations of additional points of interest that 1) are included in the plurality of points of interest for which data is stored in the point of interest database, and 2) are not included within the user-customized segment or have prominence scores lower than the first and second prominence scores. Operation 1008 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
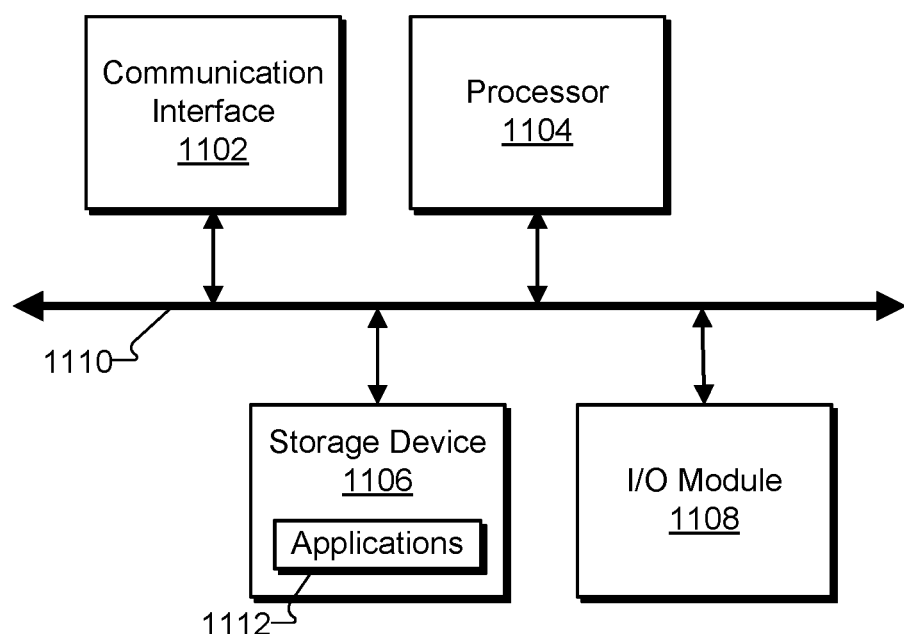
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with facilities 102 through 106 of system 100. Likewise, storage facility 108 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a geospatial navigation system from a mobile device used by a user, a user action report representative of a first action taken by the user with respect to a first point of interest included in a plurality of points of interest for which data is stored in a point of interest database accessible to the geospatial navigation system;
   identifying, by the geospatial navigation system based on the user action report, a second point of interest included in the plurality of points of interest for which data is stored in the point of interest database and with respect to which the user has not been reported to have taken a second action;
   updating, by the geospatial navigation system based on the user action report and the identifying of the second point of interest, a user-customized segment customized with respect to the user to include the first and second points of interest and to increase, within the user-customized segment, a first prominence score corresponding to the first point of interest and a second prominence score corresponding to the second point of interest, the first prominence score increased by
      a first amount if the first action is one particular action selected from a point of interest search action, a routing action, a navigation action, and a dwell action, and
      a second amount different from the first amount if the first action is another particular action different from the one particular action and also selected from the point of interest search action, the routing action, the navigation action, and the dwell action; and
   directing, by the geospatial navigation system, the mobile device to present a user interface of a geospatial navigation application in a manner that surfaces the updated user-customized segment by emphasizing representations of points of interest in accordance with respective prominence scores of the points of interest such that representations of the first and second points of interest are emphasized over representations of additional points of interest that
      are included in the plurality of points of interest for which data is stored in the point of interest database, and are not included within the user-customized segment or have prominence scores lower than the first and second prominence scores.

2. The method of claim 1, wherein:
if the first action taken by the user with respect to the first point of interest is the dwell action, the first action includes dwelling, by the user, for at least a predetermined period of time at the first point of interest; and
the mobile device detects the dwell action and, in response to the detection of the dwell action, generates the user action report accessed by the geospatial navigation system.

3. The method of claim 1, wherein:
if the first action taken by the user with respect to the first point of interest is the point of interest search action, the first action includes a search for the first point of interest by the user using the user interface of the geospatial navigation application;
if the first action taken by the user with respect to the first point of interest is the routing action, the first action includes directing, by the user, the geospatial navigation application to present, within the user interface, a route from a starting location to a location of the first point of interest; and
if the first action taken by the user with respect to the first point of interest is the navigation action, the first action includes navigating, by the user, from the starting location to the location of the first point of interest by way of navigation information provided within the user interface by the geospatial navigation application.

4. The method of claim 1, wherein the identifying of the second point of interest includes:
accessing, based on the user action report, data associated with an interest segment customized with respect to a particular interest category, the interest segment including the first and second points of interest;
determining, based on the accessed data associated with the interest segment, that the second point of interest is likely to be relevant to the user; and
identifying the second point of interest based on the determining that the second point of interest is likely to be relevant to the user.

5. The method of claim 1, wherein:
the identifying of the second point of interest includes determining a relevance score representative of a degree of relevance of the second point of interest with respect to the first point of interest, the relevance score determined based on relevance factors including at least one of
a similarity factor representative of how closely related the second point of interest is to the first point of interest based on a number of classification codes shared by both the first and second points of interest,
a proximity factor representative of how proximate a location of the second point of interest is to a location of another point of interest included in the user-customized segment, and
a prominence factor representative of an average prominence score corresponding to the second point of interest, the average prominence score based on a plurality of prominence scores within a plurality of user-customized segments customized with respect to a plurality of additional users; and
the updating of the user-customized segment to increase the second prominence score is performed by increasing the second prominence score by an amount that is determined based on the relevance score.

6. The method of claim 1, wherein the directing of the mobile device to emphasize the representations of the points of interest in accordance with the respective prominence scores of the points of interest includes directing the geospatial navigation application to represent the first and second points of interest on a map presented within the user interface when a zoom level of the map is such that the additional points of interest are not represented on the map.

7. The method of claim 1, wherein, when the first and second and additional points of interest are outside a bounding box of a map presented within the user interface due to a zoom level of the map, the directing of the mobile device to emphasize the representations of the points of interest in accordance with the respective prominence scores of the points of interest includes directing the geospatial navigation application to:
automatically adjust the zoom level of the map to include the first and second points of interest within the bounding box of the map; and
abstain from automatically adjusting the zoom level of the map to include the additional points of interest within the bounding box of the map.

8. A system comprising:
at least one physical computing device that
accesses, from a mobile device used by a user, a user action report representative of a first action taken by the user with respect to a first point of interest included in a plurality of points of interest for which data is stored in a point of interest database accessible to the geospatial navigation system;
identifies, based on the user action report, a second point of interest included in the plurality of points of interest for which data is stored in the point of interest database and with respect to which the user has not been reported to have taken a second action;
updates, based on the user action report and the identification of the second point of interest, a user-customized segment customized with respect to the user to include the first and second points of interest and to increase, within the user-customized segment, a first prominence score corresponding to the first point of interest and a second prominence score corresponding to the second point of interest, the first prominence score increased by
a first amount if the first action is one particular action selected from a point of interest search action, a routing action, a navigation action, and a dwell action, and
a second amount different from the first amount if the first action is another particular action different from the one particular action and also selected from the point of interest search action, the routing action, the navigation action, and the dwell action; and
directs the mobile device to present a user interface of a geospatial navigation application in a manner that surfaces the updated user-customized segment by emphasizing representations of points of interest in accordance with respective prominence scores of the points of interest such that representations of the first and second points of interest are emphasized over representations of additional points of interest that are included in the plurality of points of interest for which data is stored in the point of interest database, and are not included within the user-customized segment or have prominence scores lower than the first and second prominence scores.

9. The system of claim 8, wherein:
if the first action taken by the user with respect to the first point of interest is the dwell action, the first action includes dwelling, by the user, for at least a predetermined period of time at the first point of interest; and
the mobile device detects the dwell action and, in response to the detection of the dwell action, generates the user action report accessed by the at least one physical computing device.

10. The system of claim 8, wherein:
if the first action taken by the user with respect to the first point of interest is the point of interest search action, the first action includes a search for the first point of interest by the user using the user interface of the geospatial navigation application;
if the first action taken by the user with respect to the first point of interest is the routing action, the first action includes directing, by the user, the geospatial navigation application to present, within the user interface, a route from a starting location to a location of the first point of interest; and
if the first action taken by the user with respect to the first point of interest is the navigation action, the first action includes navigating, by the user, from the starting location to the location of the first point of interest by way of navigation information provided within the user interface by the geospatial navigation application.

11. The system of claim 8, wherein the at least one physical computing device identifies the second point of interest by:
accessing, based on the user action report, data associated with an interest segment customized with respect to a particular interest category, the interest segment including the first and second points of interest;
determining, based on the accessed data associated with the interest segment, that the second point of interest is likely to be relevant to the user; and
identifying the second point of interest based on the determination that the second point of interest is likely to be relevant to the user.

12. The system of claim 8, wherein:
the at least one physical computing device identifies the second point of interest by performing operations including determining a relevance score representative of a degree of relevance of the second point of interest with respect to the first point of interest, the relevance score determined based on one or more relevance factors including at least one of
a similarity factor representative of how closely related the second point of interest is to the first point of interest based on a number of classification codes shared by both the first and second points of interest,
a proximity factor representative of how proximate a location of the second point of interest is to a location of another point of interest included in the user-customized segment, and
a prominence factor representative of an average prominence score corresponding to the second point of interest, the average prominence score based on a plurality of prominence scores within a plurality of user-customized segments customized with respect to a plurality of additional users; and
the at least one physical computing device updates the user-customized segment to increase the second prominence score by increasing the second prominence score by an amount that is determined based on the relevance score.

13. The system of claim 8, wherein the at least one physical computing device directs the mobile device to emphasize the representations of the points of interest in accordance with the respective prominence scores of the points of interest by directing the geospatial navigation application to represent the first and second points of interest on a map presented within the user interface when a zoom level of the map is such that the additional points of interest are not represented on the map.

14. The system of claim 8, wherein, when the first and second and additional points of interest are outside a bounding box of a map presented within the user interface due to a zoom level of the map, the at least one physical computing device directs the mobile device to emphasize the representations of the points of interest in accordance with the respective prominence scores of the points of interest by directing the geospatial navigation application to:
automatically adjust the zoom level of the map to include the first and second points of interest within the bounding box of the map; and
abstain from automatically adjusting the zoom level of the map to include the additional points of interest within the bounding box of the map.

15. A non-transitory computer-readable medium storing instructions that, when executed, direct at least one processor of a computing device to:
access, from a mobile device used by a user, a user action report representative of a first action taken by the user with respect to a first point of interest included in a plurality of points of interest for which data is stored in a point of interest database accessible to the geospatial navigation system;
identify, based on the user action report, a second point of interest included in the plurality of points of interest for which data is stored in the point of interest database and with respect to which the user has not been reported to have taken a second action;
update, based on the user action report and the identification of the second point of interest, a user-customized segment customized with respect to the user to include the first and second points of interest and to increase, within the user-customized segment, a first prominence score corresponding to the first point of interest and a second prominence score corresponding to the second point of interest, the first prominence score increased by
a first amount if the first action is one particular action selected from a point of interest search action, a routing action, a navigation action, and a dwell action, and
a second amount different from the first amount if the first action is another particular action different from the one particular action and also selected from the point of interest search action, the routing action, the navigation action, and the dwell action; and
direct the mobile device to present a user interface of a geospatial navigation application in a manner that surfaces the updated user-customized segment by emphasizing representations of points of interest in accordance with respective prominence scores of the points of interest such that representations of the first and second points of interest are emphasized over representations of additional points of interest that are included in the plurality of points of interest for which data is stored in the point of interest database, and are not included within the user-customized segment or have prominence scores lower than the first and second prominence scores.

16. The computer-readable medium of claim 15, wherein:

if the first action taken by the user with respect to the first point of interest is the dwell action, the first action includes dwelling, by the user, for at least a predetermined period of time at the first point of interest; and the mobile device detects the dwell action and, in response to the detection of the dwell action, generates the user action report accessed by the at least one processor of the computing device.

17. The computer-readable medium of claim 15, wherein:

if the first action taken by the user with respect to the first point of interest is the point of interest search action, the first action includes a search for the first point of interest by the user using the user interface of the geospatial navigation application;

if the first action taken by the user with respect to the first point of interest is the routing action, the first action includes directing, by the user, the geospatial navigation application to present, within the user interface, a route from a starting location to a location of the first point of interest; and if the first action taken by the user with respect to the first point of interest is the navigation action, the first action includes navigating, by the user, from the starting location to the location of the first point of interest by way of navigation information provided within the user interface by the geospatial navigation application.

18. The computer-readable medium of claim 15, wherein the at least one processor of the computing device identifies the second point of interest by:

accessing, based on the user action report, data associated with an interest segment customized with respect to a particular interest category, the interest segment including the first and second points of interest;

determining, based on the accessed data associated with the interest segment, that the second point of interest is likely to be relevant to the user; and identifying the second point of interest based on the determination that the second point of interest is likely to be relevant to the user.

19. The computer-readable medium of claim 15, wherein:

the at least one processor of the computing device identifies the second point of interest by performing operations including determining a relevance score representative of a degree of relevance of the second point of interest with respect to the first point of interest, the relevance score determined based on one or more relevance factors including at least one of a similarity factor representative of how closely related the second point of interest is to the first point of interest based on a number of classification codes shared by both the first and second points of interest, a proximity factor representative of how proximate a location of the second point of interest is to a location of another point of interest included in the user-customized segment, and a prominence factor representative of an average prominence score corresponding to the second point of interest, the average prominence score based on a plurality of prominence scores within a plurality of user-customized segments customized with respect to a plurality of additional users; and the at least one processor of the computing device updates the user-customized segment to increase the second prominence score by increasing the second prominence score by an amount that is determined based on the relevance score.

20. The computer-readable medium of claim 15, wherein the at least one processor of the computing device directs the mobile device to emphasize the representations of the points of interest in accordance with the respective prominence scores of the points of interest by directing the geospatial navigation application to represent the first and second points of interest on a map presented within the user interface when a zoom level of the map is such that the additional points of interest are not represented on the map.

* * * * *